(12) United States Patent
Olsson et al.

(10) Patent No.: US 12,461,271 B1
(45) Date of Patent: *Nov. 4, 2025

(54) DUAL SENSED LOCATING SYSTEMS AND METHODS

(71) Applicant: SeeScan, Inc., San Diego, CA (US)

(72) Inventors: Mark S. Olsson, La Jolla, CA (US); Michael J. Martin, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,239

(22) Filed: Dec. 2, 2021

Related U.S. Application Data

(63) Continuation of application No. 17/068,156, filed on Oct. 12, 2020, now Pat. No. 11,204,436, which is a continuation of application No. 13/787,711, filed on Mar. 6, 2013, now Pat. No. 10,809,408.

(60) Provisional application No. 61/607,510, filed on Mar. 6, 2012.

(51) Int. Cl.
*G01V 3/08* (2006.01)
*G01V 11/00* (2006.01)
*H04N 7/18* (2006.01)

(52) U.S. Cl.
CPC .............. *G01V 3/087* (2013.01); *G01V 11/00* (2013.01); *H04N 7/183* (2013.01)

(58) Field of Classification Search
CPC .......... G01V 3/087; G01V 11/00; H04N 7/18; H04N 7/181; H04N 7/183; H04N 7/185; H04N 5/2252; G04N 13/0253; G04N 13/0239; G01M 3/005; G01M 3/38; E21B 47/0002; F27D 21/02; G08B 13/19621
USPC .... 348/82, 84, 85, 83, 61, 143, 158, 13.018; 342/459, 458; 324/326, 329, 331, 330, 324/300

See application file for complete search history.

(56) References Cited

U.S. PATENT DOCUMENTS

| | | | |
|---|---|---|---|
| 7,136,765 B2 | 11/2006 | Maier et al. | |
| 7,221,136 B2 | 5/2007 | Olsson et al. | |
| 7,276,910 B2 | 10/2007 | Prsha et al. | |
| 7,288,929 B2 | 10/2007 | Prsha et al. | |
| 7,298,126 B1 | 11/2007 | Olsson et al. | |
| 7,332,901 B2 | 2/2008 | Olsson et al. | |
| 7,336,078 B1 | 2/2008 | Merewether et al. | |
| 7,443,154 B1 * | 10/2008 | Merewether | G01V 3/165 324/67 |
| 7,498,797 B1 | 3/2009 | Olsson et al. | |
| 7,498,816 B1 | 3/2009 | Olsson et al. | |
| 7,557,559 B1 | 7/2009 | Olsson et al. | |
| 7,733,077 B1 * | 6/2010 | Merewether | G01V 3/08 324/67 |
| 7,741,848 B1 * | 6/2010 | Olsson | G01V 3/102 702/76 |
| 7,755,360 B1 | 7/2010 | Martin | |
| 7,825,647 B2 | 11/2010 | Olsson et al. | |

(Continued)

*Primary Examiner* — Rebecca A Volentine
*Assistant Examiner* — Jimmy S Lee
(74) *Attorney, Agent, or Firm* — Steven C. Tietsworth, Esq.; Michael J. Pennington, Esq.

(57) ABSTRACT

Utility locators for providing information about hidden or buried pipes or other cavities are disclosed. A locator may be configured to provide positional information associated with the buried utility based on signals received from a line trace signal and a sonde signal and present the positional information on a visual display or other output device.

16 Claims, 17 Drawing Sheets

(56) References Cited

U.S. PATENT DOCUMENTS

| | | |
|---|---|---|
| 7,830,149 B1 | 11/2010 | Olsson et al. |
| 7,863,885 B1 | 1/2011 | Olsson et al. |
| 7,948,236 B1 | 5/2011 | Olsson et al. |
| 7,969,151 B2 | 6/2011 | Bench |
| 7,990,151 B2 | 8/2011 | Olsson et al. |
| 8,013,610 B1 | 9/2011 | Merewether et al. |
| 8,035,390 B2 | 10/2011 | Olsson et al. |
| 8,106,660 B1 | 1/2012 | Merewether |
| 8,203,343 B1 | 6/2012 | Olsson et al. |
| 8,248,056 B1 | 8/2012 | Olsson et al. |
| 8,264,226 B1 | 9/2012 | Olsson et al. |
| 2006/0181280 A1* | 8/2006 | Mulcahey ............. G01V 3/165 324/326 |
| 2008/0275648 A1* | 11/2008 | Illfelder ................ E21B 47/022 702/10 |
| 2008/0314984 A1* | 12/2008 | Alexandru ....... G06K 19/06187 235/449 |
| 2009/0005961 A1* | 1/2009 | Grabowski ........ G02B 27/0101 701/532 |
| 2010/0141261 A1* | 6/2010 | Overby ................... G01V 3/12 702/2 |
| 2010/0225752 A1 | 9/2010 | Bench et al. |
| 2011/0109437 A1 | 5/2011 | Olsson |
| 2011/0112787 A1* | 5/2011 | Daw ....................... G01V 3/15 702/95 |
| 2012/0242341 A1 | 9/2012 | Olsson et al. |
| 2013/0200901 A1 | 8/2013 | Olsson et al. |
| 2013/0245990 A1 | 9/2013 | Merewether |

* cited by examiner

DUAL SENSED LOCATING SYSTEMS AND METHODS

CROSS-REFERENCE TO RELATED APPLICATIONS

This application claims priority under 35 U.S.C. § 119(e) to U.S. Provisional Patent Application Ser. No. 61/607,510, filed Mar. 6, 2012, entitled DUAL SENSED LOCATING SYSTEMS AND METHODS, the content of which is incorporated by reference herein in its entirety for all purposes.

FIELD

This disclosure relates generally to utility locating systems. More specifically, but not exclusively, the disclosure relates to systems and methods for locating buried or otherwise inaccessible objects by detecting a plurality of electromagnetic signals, such as signals at different frequencies and/or having different magnetic field configurations, and providing information related to the location of the buried objects based at least in part on each of the plurality of electromagnetic signals.

BACKGROUND

Systems for locating buried or otherwise inaccessible pipes and other conduits by sensing electromagnetic signals are known in the art. These systems may include various means to convey information to a user such as audible outputs, such as tones or beeps, or visually, such as in the form of lines or icons on a graphical user interface display.

Many of these systems are unduly complicated in use and may be further improved by increased resolution and functionality. Accordingly, there is a need for improved locator systems that are user friendly with enhanced resolution and functionality, as well as providing other potential advantages.

SUMMARY

In accordance with various aspects, a dual sensed locating system may include a handheld utility locator device enabled to simultaneously sense electromagnetic signals of two or more electromagnetic field configurations and/or frequencies. These may be signals emitted from a push-cable or conductor within a pipe or conduit, commonly referred to as "line tracing," as well as signals emitted by a sonde, also known as a transmitter, beacon, or duct probe. The magnetic field configurations associated with line currents may be circular or approximately circular fields as given by the right hand rule (also denoted herein as a "line field" or "circular field"). Conversely, the magnetic field configuration generated by a sonde, beacon, or duct probe may be a magnetic dipole-type magnetic field (also denoted herein as a "sonde field" or dipole field").

For example, in one aspect, the disclosure relates to a system for locating buried objects. The system may include, for example, a receiver module configured to receive a line trace signal and a sonde signal and provide a corresponding line trace output signal and a sonde output signal, a processing element configured to receive the line trace output signal and the sonde output signal and generate, based as least in part on the line trace output signal and the sonde output signal, information associated with the buried object, and an output device configured to provide a display associated with the buried object, such as a display of the location or position of the buried object, based at least in part on the information associated with the buried object.

In another aspect, the disclosure relates to a method of providing buried object information. The method may include, for example, receiving a line trace signal and receiving a sonde signal. The method may further include generating, based in part on the line trace signal and the sonde signal, information associated with the buried object. The method may further include providing a representation of the buried object, based on the information associated with the buried object, on an output device.

In another aspect, the disclosure relates to a system for locating buried objects. The system may include, for example, a push-cable and a sonde mechanically coupled to the push-cable for generating a sonde signal. The system may further include a transmitter electrically coupled to the push-cable for generating a line trace signal. The system may further include a locator. The locator may include a receiver module configured to receive the line trace signal and the sonde signal and provide a corresponding line trace output signal and a sonde output signal. The locator may include a processing element. The processing element may be configured to receive the line trace output signal and the sonde output signal and generate, based as least in part on the line trace output signal and the sonde output signal, information associated with the buried object. The locator may include an output device configured to provide positional information of the buried object based on the information associated with the buried object. The positional information may be information defining a location and/or orientation of the push-cable and a location or orientation of the sonde. The positional information may further include information associated with magnetic fields generated by the sonde and push cable including, for example, field strength, angle, estimated depth of the push-cable and/or sonde, type of magnetic field, frequency, and/or other sensed parameters.

In another aspect, the disclosure relates to method of providing buried object information on a buried utility locator. The method may include, for example, receiving a line trace signal from a push-cable and a sonde signal from a sonde coupled to or in proximity of the push-cable. The method may further include generating, based in part on the line trace signal and the sonde signal, information associated with the buried object. The method may further include providing a representation of the buried object, based on the information associated with the buried object, on an output device. The output device may be a visual display device, such as an LCD panel or LED panel or other visual display device. The output device may be an audio output device. The representation of the buried object may include a graphical representation of the push-cable and the sonde. The representation of the buried object may include data fields and/or icons associated with the push-cable and the sonde. The data fields may include data such as field strength of received line trace and/or sonde signals, field angles, depth of the buried object or push-cable or sonde, frequency of the sonde and/or line trace signals, and/or other information associated with the sonde and/or line trace signals and the buried object shape or structure or position or location or orientation.

In another aspect, the disclosure relates to devices and systems for implementing the above-described methods, in whole or in part.

In another aspect, the disclosure relates to means for implementing the above-described methods, in whole or in part.

In another aspect, the disclosure relates to a computer readable medium including instructions for causing a computer to implement the above-described methods, in whole or in part.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Overview

Figure 1:
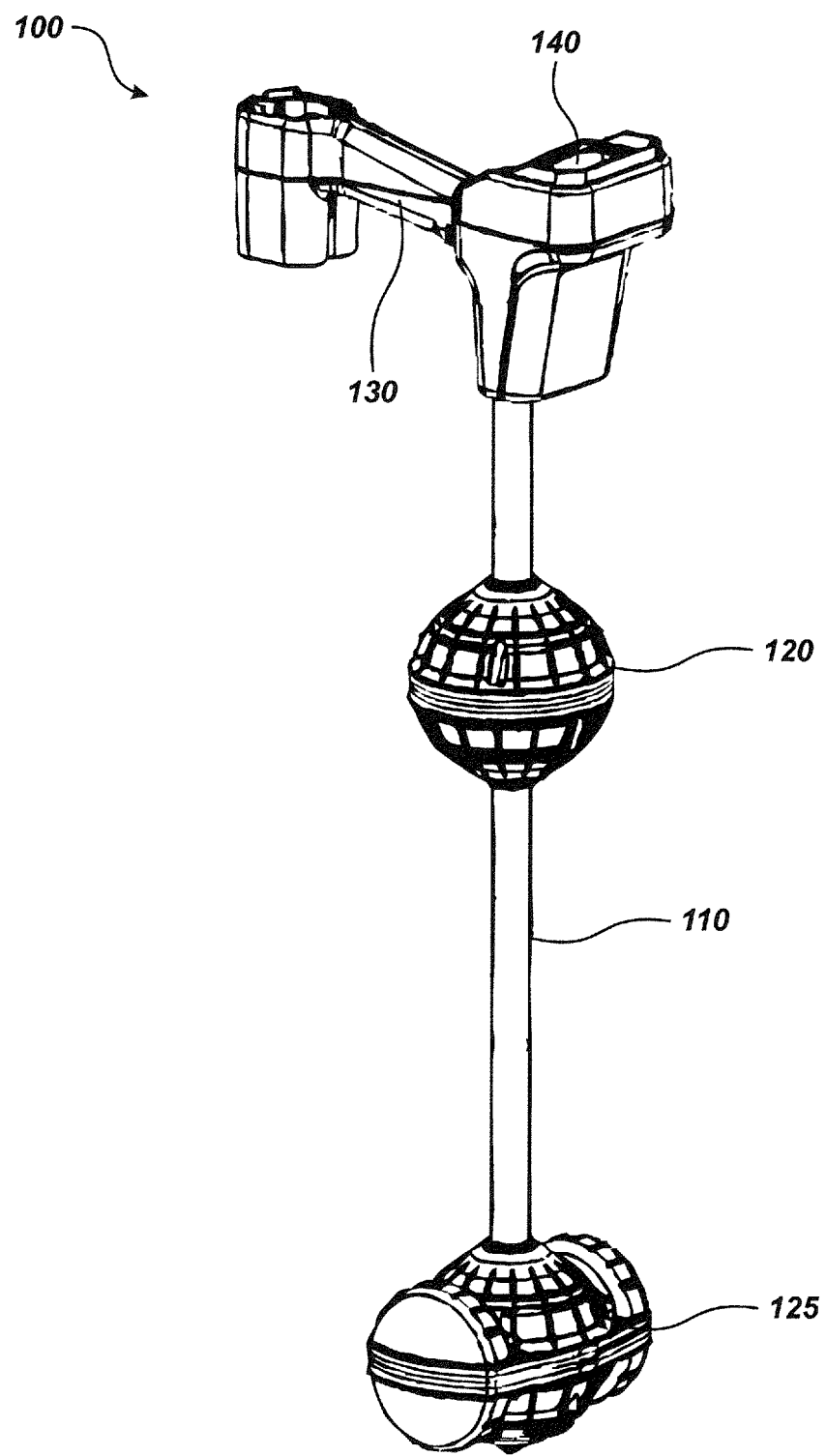
FIG. 1 is an isometric view of a handheld locator device embodiment.

In accordance with various aspects, a dual sensed locating system may include a handheld utility locator device configured to simultaneously sense electromagnetic signals of two or more electromagnetic field configurations and/or frequencies and generate position, location, motion (of the locator device relative to a buried object and/or sonde or beacon) information that may be stored, provided on an output device and/or sent to other communicatively coupled devices or systems, such as camera control units, transmitters, cable reels, notebook computers, tablets, cellular phones, and the like.

The sensed electromagnetic signals may be signals emitted from a push-cable or conductor within a pipe or conduit, the sensing of which is commonly referred to as "line tracing," as well as signals emitted by a sonde, also known as a transmitter, beacon, or duct probe, which may be coupled to or positioned in proximity to an end of the push-cable or at other reference positions along the push-cable.

The magnetic field configurations associated with line currents may be circular or approximately concentrically circular fields as given by the right hand rule (also denoted herein as a "line field" or "circular field"). Conversely, the magnetic field configuration generated by a sonde, beacon, or duct probe may be a magnetic dipole-type magnetic field (also denoted herein as a "sonde field" or dipole field"). The signals provided by these different field configurations may be further distinguished by using different frequencies and/or other parameters, such as phases, modulations, or other signal variations. In an exemplary embodiments, line trace magnetic field signals emitted from a buried wire or other conductors, such as a pipe, tracing wire, electrical cable, or other conductor may be sensed along with magnetic field signals emitted from a sonde (e.g., magnetic dipoles) and positional information associated with the utility may be determined, stored, and/or provided as an output to a user based on both types of magnetic field signals. In some embodiments, a camera head coupled to a distal end of a push-cable may include or be coupled to or in the proximity of a sonde so that images or video generated from the camera head may be associated with the positional information determined by the locator.

As used herein, the term "sonde" refers to a device that may be inserted into a pipe or conduit and is energized with an electrical source at a particular frequency and/or using a particular phase and/or modulation. The frequencies of the line trace and the sonde may be energized such that they will emit different frequencies. For instance, the sonde signal may be a lower frequency than the line trace signal in an exemplary embodiment. Alternately, in some embodiments the sonde signal may be higher in frequency than the line trace signal.

The sonde and locator device may use a variety of sensors including, but not limited to, one or more sondes, including single or multi-axis sondes, wireless link, GPS, accelerometers, gyroscope sensors, optical and imaging sensors, including cameras, ground tracking devices, and pipe mapping systems. Furthermore, the locator system may be enabled to optically or acoustically measure the distance between the ground surface and the bottom locator antenna of the handheld locator. The sonde may be enabled to determine, measure, and wirelessly communicate tilt to the locator system and depict the degree and direction of the tilt on its user interface display. Positional ambiguities between the line trace and sonde signals may be indicated on a user interface display as, for instance, a blurred line and/or a bent line and/or a sonde icon. Data collected by the locator system may also be logged and stored into a data base.

The sonde and locator device may use a variety of sensor devices including, but not limited to, one or more sondes, including single or multi-axis sondes, wireless links and modules, GPS modules, accelerometers, gyroscope sensors, compass sensors, optical and/or imaging sensors, including cameras, ground tracking devices, as well as pipe mapping systems.

Furthermore, the locator system may be configured to optically or acoustically measure the distance between the ground surface and the bottom locator antenna of the handheld locator. The sonde may be configured to determine, measure, and wirelessly communicate tilt or other position or rotational information to the locator system, which may then provide an indication or depiction of the degree and direction of the tilt on an output devices, such as a its user interface display device or audio device.

Positional ambiguities between the line trace and sonde signals may be indicated on a user interface display as, for instance, a blurred line and/or a bent line and/or a sonde icon. Other ambiguities or differences in measurements or location information determined by the two different electromagnetic field signals may also be represented in other audible and/or visual displays, such as through the use of varying tones or duty cycles, providing fuzziness or color differences (on a visual output) or using other techniques for showing such ambiguities. Data collected by the locator system may also be logged and stored into a memory of the locator device and/or may be transferred, such as via a wired or wireless link, to another system and/or a database for storage and/or analysis.

Locator systems in accordance with the various aspects described and illustrated herein may be employed in locate/ line trace as well as other operations, such as horizontal drilling operations. For example, locator systems may be used in horizontal drilling operations, and equipment where an inductive clamp device may be used to energize a drill's associated drill string and a sonde may be positioned near the end of the same drill string.

In one aspect, the disclosure relates to a system for locating buried objects. The system may include, for example, a receiver module configured to receive a line trace signal and a sonde signal and provide a corresponding line trace output signal and a sonde output signal, a processing element configured to receive the line trace output signal and the sonde output signal and generate, based as least in part on the line trace output signal and the sonde output signal, information associated with the buried object, and an output device configured to provide a display associated with the buried object, such as a display of the location or position of the buried object, based at least in part on the information associated with the buried object.

The output device may be, for example, a visual display device and the display of the location or position of the buried object may be provided on the visual display device, such as in the form of a graphic display of the buried object, sonde, and/or information associated with the buried object or sonde. The visual display device may be an LCD display or other visual display device. Alternately, or in addition, the output device may be an audio output device, such as a speaker or headphone, and the location information may be provided on the audio output device. Alternately, or in addition, the information associated with the buried object may be provided to a memory or other data storage device or system.

The information associated with the buried object may, for example, be provided to a wired or wireless transmitter. The sonde signal and the line trace signal have different magnetic field configurations. The sonde signal may have a dipole magnetic field and the line trace signal may have a circular magnetic field. The sonde and line trace signals may be at different frequencies. The sonde signal may be at a lower frequency than the line trace signal.

The line trace signal may, for example, be used to resolve a position of the sonde with respect to the pipe axis. An indication of ambiguity may be provided on the output device when the measured sonde axis and the line trace axis are substantially not aligned. The output device may be a visual display device and the indication of ambiguity may be a visual indication. The visual indication may be a display of blurring or fuzziness on the display associated with the line trace and/or sonde. A line trace line may be blurred or made fuzzy on the display. Alternately, or in addition, the visual indication may be a dashed or broken line or line element. Information associated with a tilt of the sonde may be provided. Based on received tilt information, a sonde tilt indication from horizontal may be displayed on the output device in response to sensed or received sonde tilt information. The sonde tilt information may be received wirelessly from a transmitter coupled to the sonde. The sonde tilt information may be transmitted wirelessly from a signal transmitting unit providing the line trace signal.

The system may further include, for example, a push-cable. A camera may be disposed at an end of the push-cable. A three axis accelerometer may be coupled to or incorporated in an end of the push-cable. A three axis compass may be coupled to or incorporated in an end of the push-cable. A three axis gyroscopic sensor may be coupled to or incorporated in an end of the push-cable. A source of the magnetic moment signal strength of the transmitting sonde may be known by or provided to the locating device for later data post processing.

The system may further include, for example, a ground location determination device or apparatus. The ground location determination device may be integral with or coupled to the locator for determining a distance between a locator antenna and the ground surface. The determined distance may be used in part to provide output information associated with the buried object and/or sonde on the output device. The output information may be information associated with a depth and/or tilt of the sonde.

In another aspect, information from both the line trace signal and the sonde signal may be used to resolve positional ambiguities between the two signals. For instance, the line trace signal may be used to resolve the sonde in relation to the axis of a pipe or conduit under inspection. Furthermore, when the signal of the sonde is sensed to be displaced from an orthogonal orientation to the sensed signal of the line trace, this displacement may be measured and indicated on the output device, such as on a user interface display.

In another aspect, positional ambiguities between the two signals may be indicated on an output device, such as a user interface display. For instance, when the measured sonde axis and the line trace axis are not substantially aligned, a blurred line may appear on the user interface display.

In another aspect, the sonde may be configured to determine, measure, and wirelessly communicate tilt to the locator system. The user interface display of the locator system may than show the measured tilt of the sonde. Furthermore, a sonde and/or camera, or the end of a push-cable may also include various sensors including, but not limited to a three axis accelerometer, a three axis compass, and/or a three axis gyroscopic sensor. The sensors may be integrated into the sonde or a camera and sonde or both.

In another aspect, the user interface may display the sonde position as the end of a displayed line trace line. Alternately, the user interface may omit or vary the sonde position from the displayed line trace line. The line trace line may also be displayed as an increasingly blurred line based on parameters such as the further from the target that the sonde is located. Measured tilt, rotation, and/or other characteristics of the sonde may also be indicated as a blurred or tilted or rotated sonde icon on the user interface display.

In another aspect, the disclosure relates to a method of providing buried object information. The method may include, for example, receiving a line trace signal and receiving a sonde signal. The method may further include generating, based in part on the line trace signal and the sonde signal, information associated with the buried object.

The method may further include providing a representation of the buried object, based on the information associated with the buried object, on an output device.

In another aspect, one or more dipole nodes may be fixed along a separate tracer wire secured to, for instance a push-cable, drill string, or other similar cabling. The orientation of the dipole fields may vary between nodes. For instance, one node may emit a dipole field with an axis that aligns with the axis of the tracer wire whereas another node may emit a dipole field with an axis perpendicular to that of the tracer wire. These nodes may ideally be data transmitting devices such as radio-frequency identification (RFID) and capable of transmitting back at a frequency different than that of the excitation field.

The method may include measuring/sensing magnetic fields from a line trace and a sonde and generating corresponding signals. The signals may then be sent, such as from a locator module to a processing element, for dual sense processing. Information associated with the buried object may be generated based in part on the line trace signal and the sonde signal. A representation of the buried object may be provided, such as on a visual display device or audio output device, based on the information associated with the buried object. The representation may include display of the location, position, orientation, or other information about the buried object and/or information about sondes positioned within the buried object and/or location between a locator and locator elements such as antennas and the sondes or buried objects. A determination of a distance between a locator device element, such as an antenna, and the ground surface may optionally be performed. The distance information may be provided for use in determining the information associated with the buried object.

The output device may be, for example, an audible output device. Alternately, or in addition, the output device may be a visual display device. The information associated with the buried object may include information associated with a location, position, and/or orientation of the buried object and/or other devices such as sondes. The information may be determined relative to a location of a user and buried object locator or other reference.

The information associated with the location, position, and/or orientation may, for example, be provided as a visual display, an audible output and/or a combination display and output. The visual display of the information may include blurring of the location. The blurring may be based on a determined distance to the sonde and/or orientation of the sonde relative to the buried object locator or locator antennas. The visual display of the information may include a display of information associated with a tilt or rotation of the sonde and/or other positional, orientation, or motion information associated with the sonde. The visual display of the information may include a display of information associated with a non-orthogonality between the sonde signal and the line trace signal. The information associated with the buried object may be information associated with a position of the sonde within the buried object. Information from both the line trace signal and the sonde signal may be used to determine the position of the sonde within the buried object.

The information associated with the buried object may be information associated with a difference in alignment between the sonde axis and line trace axis. The method may further include measuring the line trace and providing information associated with the difference in alignment on a display device. The information associated with the buried object may be stored in a memory, database, or other storage device or system. The method may include displaying a sonde target position at the end of a displayed line trace line on the output device.

The sonde position may, for example, be displayed as blurred or made fuzzy on the output display device, such as along a sonde equator axis. A determination may be made as to whether the axes of the sonde and line trace are parallel. The blurring may be provided to indicate positional uncertainty when the axis of the trace and the axis of the sonde are determined to not be parallel. The sonde location may, for example, be displayed as an icon on the output device. The sonde icon may be displayed along a line trace axis in a blurred fashion when the sonde is tilted from horizontal.

The method may further include, for example, determining or measuring a distance between the ground surface and a bottom locator receiving antenna. The method may further include determining, based in part on the measured distance and in part based on received sonde information, a pitch or tilt angle of the sonde.

In another aspect, the disclosure relates to a system for locating buried objects. The system may include, for example, a push-cable and a sonde mechanically coupled to the push-cable for generating a sonde signal. The system may further include a transmitter electrically coupled to the push-cable for generating a line trace signal. The system may further include a locator. The locator may include a receiver module configured to receive the line trace signal and the sonde signal and provide a corresponding line trace output signal and a sonde output signal. The locator may include a processing element. The processing element may be configured to receive the line trace output signal and the sonde output signal and generate, based as least in part on the line trace output signal and the sonde output signal, information associated with the buried object. The locator may include an output device configured to provide positional information of the buried object based on the information associated with the buried object. The positional information may be information defining a location and/or orientation of the push-cable and a location or orientation of the sonde. The positional information may further include information associated with magnetic fields generated by the sonde and push cable including, for example, field strength, angle, estimated depth of the push-cable and/or sonde, type of magnetic field, frequency, and/or other sensed parameters.

The output device may be, for example, a visual display device and the positional information may be provided on the visual display device in a user interface. The positional information may include a representation of the push-cable and a representation of the sonde on a user interface of the visual display device. The representation may be in form of a graphic such as a marker, line, or icon. The visual display device may be an LCD display or an LED or other display device. The visual display device may be a touchscreen device. The output device may be an audio output device, and the positional information is provided on the audio output device and/or on the visual display device or on both devices. The positional information associated with the buried object may be provided to a data storage device such as a memory or other data storage device such as a disc drive or solid state memory storage device. The positional information may be transmitted from the locator to another electronic computing system or device.

The sonde may, for example, be configured so that the sonde signal has a dipole magnetic field configuration. The line trace signal may have a circular magnetic field configuration, such as a circular magnetic field corresponding to current flowing from a transmitted through the push-cable and returning to the transmitter through a ground connection. The sonde and line trace signals may be at different frequencies. The sonde signal may be at a higher frequency than the line trace signal or at a lower frequency that the line trace signal. The sonde signal and line trace signal may be at the same frequency. The sonde signal and the line trace signal may have different modulations and/or different harmonics.

The generating information associated with the buried object may, for example, include processing the line trace signal to resolve a position of the sonde with respect to the pipe axis. The generating information associated with the buried object may include determining an indication of ambiguity and providing the indication of ambiguity on the output device when the measured sonde axis and the line trace axis are determined be not be substantially aligned. The output device may be a display device and the indication of ambiguity may be a visual indication. The visual indication may be on a user interface in the form of a blurring or fuzziness on the display line, symbol, or icon associated with the line trace and/or sonde.

The display may, for example, include a display on the output device when the sonde tilt indication from horizontal is sensed or received. The tilt information may be received wirelessly from a transmitter coupled to the sonde.

The system may, for example, further include a camera disposed at the end of the push-cable for generating images or video of a pipe or cavity being inspected. The information associated with the buried object may be associated with the images or video and stored in a memory. The information associated with the buried object may be incorporated on the video or images or within data defining the video or images as metadata. The system may further include a jetting or cutting tool disposed at or in proximity to the sonde, such as at the distal end of the push cable. The system may further include a three axis accelerometer coupled to or incorporated in an end of the push-cable.

The system may further include, for example, a ground location determination device coupled to the locator for determining a distance between a locator antenna and the ground surface. The ground location determination device may be a mechanical, acoustic, or optical ground tracking device. The ground location determination device may be a GPS receiver module or other satellite or terrestrial location system device.

The information associated with the buried object may, for example, be generated in part based on gradient signals generated from the sonde signal. The gradient signals may be generated by a pair of gradient antennas on or coupled to the locator. The magnetic field signals may further include multi-dimensional magnetic field signals provided from one or more omnidirectional antenna arrays. The information associated with the buried object may be generated from line trace and/or sonde signals received by the pair of gradient antennas and the one or more omnidirectional antenna arrays.

In another aspect, the disclosure relates to method of providing buried object information on a buried utility locator. The method may include, for example, receiving a line trace signal from a push-cable and a sonde signal from a sonde coupled to or in proximity of the push-cable. The method may further include generating, based in part on the line trace signal and the sonde signal, information associated with the buried object. The method may further include providing a representation of the buried object, based on the information associated with the buried object, on an output device. The output device may be a visual display device, such as an LCD panel or LED panel or other visual display device. The output device may be an audio output device. The representation of the buried object may include a graphical representation of the push-cable and the sonde. The representation of the buried object may include data fields and/or icons associated with the push-cable and the sonde. The data fields may include data such as field strength of received line trace and/or sonde signals, field angles, depth of the buried object or push-cable or sonde, frequency of the sonde and/or line trace signals, and/or other information associated with the sonde and/or line trace signals and the buried object shape or structure or position or location or orientation.

The information associated with the buried object may, for example, include a representation of the push-cable and a representation of the sonde on the visual display device as oriented within the buried object. The information associated with the buried object may be information associated with a position of the sonde within the buried object, and wherein information from both the line trace signal and the sonde signal may be used to determine the position of the sonde within the buried object. The information associated with the buried object may be information associated with a difference in alignment between the sonde axis and line trace axis. The method may further include measuring the line trace and providing information associated with the difference in alignment on a display device.

The method may, for example, include sending the information associated with the buried object to a camera control unit, transmitter, cable reel, or other electronic computing system. The information may be sent by a wired or wireless data connection. The wireless data line may be a Wi-Fi or Blu-tooth or cellular data link or other wireless communication link. The method may, for example, further include combining images or video from a camera coupled to the push-cable with the information associated with the buried object and storing the combined information in a memory. The information may be combined with video or images in the camera control unit, cable reel, or other electronic computing system.

The sonde position may, for example, be shown at the end of a displayed line trace line on the display device. The sonde position may be displayed as blurred, dashed, grayed, or otherwise distinguished on the output device along a sonde equator axis. The blurring may be provided to indicate positional uncertainty when the axis of the trace and the axis of the sonde are determined to not be parallel. The sonde location may be displayed as an icon on the output device. The sonde icon may be displayed along a line trace axis in a blurred fashion when the sonde is tilted from horizontal.

The method may, for example, include measuring a distance between the ground surface and a bottom locator receiving antenna. The method may further include determining, based in part on the measured distance and in part based on received sonde information, a pitch angle of the sonde.

In another aspect, the disclosure relates to devices and systems for implementing the above-described methods, in whole or in part.

In another aspect, the disclosure relates to means for implementing the above-described methods, in whole or in part.

In another aspect, the disclosure relates to a computer readable medium including instructions for causing a processing element or other electronic computing device or system to implement the above-described methods, in whole or in part.

In another aspect, a locator system as described above may be employed in horizontal drilling operations and equipment where an inductive clamp device may be used to energize the drill rod and a sonde is positioned near the end of the same drill rod.

Various additional aspects, features, and functions are described below in conjunction with the appended Drawings.

EXAMPLE EMBODIMENTS

It is noted that various embodiments of systems in accordance with the disclosure herein may be combined with locator and/or sonde systems for detecting and processing line trace and/or dipole field electromagnetic signals as described in, for example, co-assigned United States patents and patent applications including U.S. Pat. No. 7,009,399, issued Mar. 7, 2006, entitled OMNIDIRECTIONAL SONDE AND LINE LOCATOR, U.S. Pat. No. 7,443,154, issued Oct. 28, 2008, entitled MULTI-SENSOR MAPPING OMNIDIRECTIONAL SONDE AND LINE LOCATOR, U.S. Pat. No. 7,518,374, issued Apr. 14, 2009, entitled RECONFIGURABLE PORTABLE LOCATOR EMPLOYING MULTIPLE SENSOR ARRAY HAVING FLEXIBLE NESTED ORTHOGONAL ANTENNAS, U.S. Pat. No. 7,619,516, issued Nov. 19, 2009, entitled SINGLE AND MULTI-TRACE OMNIDIRECTIONAL SONDE AND LINE LOCATORS AND TRANSMITTER USED THEREWITH, U.S. Utility patent application Ser. No. 13/676,989, filed Nov. 14, 2012, entitled QUAD-GRADIENT COILS FOR USE IN LOCATING SYSTEMS, as well as U.S. patent application Ser. No. 13/677,223, filed Nov. 14, 2012, entitled MULTI-FREQUENCY LOCATING SYSTEMS AND METHODS. The content of each of these applications is incorporated by reference herein in its entirety.

Turning to FIG. 1, a buried object locator, such as the locator device embodiment 100 as shown, may include a central shaft or mast 110 containing an upper antenna node 120 and a lower antenna node 125 (and/or additional antenna nodes, not shown, in alternate embodiments such as additional nodded between the upper and lower antenna nodes as shown, quad gradient antenna nodes, and the like). Internal signal processing circuitry, which may include one or more processing elements and other electronic, mechanical, optical, or other components (not shown) may also be included in locator device 100. For example, the locator 100 may include additional modules such as wired or wireless communication modules, which may be used to communicate with other devices to send or receive control data or information and/or provide determined positional information associated with a hidden or buried utility to other devices. Such other devices may include, for example, tablet or notebook computers or other electronic computing systems, buried utility transmitters, cable-reels, camera control units (CCUs) for controlling operation of a camera head and/or other devices such as a sonde and/or devices for displaying images or video captured by the camera head, cellular phones or similar devices, wireless data networks, such as cellular or other local area networks (LANs) or wide area networks (WANs), and the like. The locator 100 may also include elements such as GPS receiver modules or other positioning system modules to receive signals and determine the locator's location in latitude/longitude or other terrestrial coordinates, inertial navigation modules or devices such as compass sensors, accelerometers, tilt sensors, as well as other elements such as intelligent batteries and related components such as battery shoes/docks such as are described in, for example, co-assigned U.S. patent application Ser. No. 13/532,721, filed Jun. 25, 2012, entitled MODULAR BATTERY PACK APPARATUS, SYSTEMS, AND METHODS, the content of which is incorporated by reference herein.

A handle 130, with a visual user interface display 140, may be positioned on the top of the locator device 100. Other output devices may be included in locator device 100, such as audio output devices (e.g., speakers, piezo-devices, etc), headphone jacks and associated circuitry, microphones, other audible or visual output devices, and/or other user interface devices as know or developed in the art. In some embodiments, user output may be provided as visual displays, while in other embodiments user output may be provide audibly or as both audio and visual outputs.

In alternative embodiments various antenna and signal processing configurations may be used for sensing and processing magnetic field signals provided from buried lines/conductors and sondes or other devices. Details of such aspects of locator systems and antenna configurations that may be used in conjunction with the disclosure herein in various embodiments are described in, for example, co-assigned U.S. Pat. Nos. 7,009,399, 7,443,154, issued Oct. 28, 2008, entitled MULTI-SENSOR MAPPING OMNIDIRECTIONAL SONDE AND LINE LOCATOR, U.S. Pat. No. 7,518,374, issued Apr. 14, 2009, entitled RECONFIGURABLE PORTABLE LOCATOR EMPLOYING MULTIPLE SENSOR ARRAY HAVING FLEXIBLE NESTED ORTHOGONAL ANTENNAS, U.S. Pat. No. 7,619,516, issued Nov. 17, 2009, entitled SINGLE AND MULTI-TRACE OMNIDIRECTIONAL SONDE AND LINE LOCATORS AND TRANSMITTERS USED THEREWISH, as well as U.S. Provisional patent application Ser. No. 13/469,024, filed May 10, 2012, entitled BURIED OBJECT LOCATOR APPARATUS AND SYSTEMS. The content of each of these patents and patent applications is incorporated by reference herein.

A locator such as locator device 100 may include various sensors and associated devices configured to, for instance, optically and/or acoustically, and/or mechanically measure the distance between the ground surface and the lower antenna node 125 of the locator device 100. For example, embodiments of ground tracking devices that may be used in conjunction with the disclosure here are described in co-assigned patent applications including U.S. patent application Ser. No. 13/766,670, filed Feb. 13, 2013, entitled OPTICAL GROUND TRACKING APPARATUS, SYSTEMS, AND METHODS, U.S. Provisional Patent Application Ser. No. 61/598,312, filed on Feb. 13, 2012, entitled OPTICAL GROUND TRACKING LOCATOR DEVICES AND METHODS, U.S. Provisional Patent Application Ser. No. 61/615,810, filed on Mar. 26, 2012, entitled GROUND-TRACKING SYSTEMS AND APPARATUS, to U.S. Provisional Patent Application Ser. No. 61/618,746, filed on Mar. 31, 2012, entitled DUAL ANTENNA SYSTEMS WITH VARIABLE POLARIZATION, and U.S. Provisional Patent Application Ser. No. 61/679,672, filed Aug. 3, 2012, entitled OPTICAL GROUND TRACKING APPARATUS, SYSTEMS & METHODS. The content of each of these applications is incorporated by reference herein.

Furthermore, the locator system may be configured to wirelessly communicate with a sonde or other transmitting unit or CCU or cable reel, such as through the use of a transmitter and/or receiver module, such as a Bluetooth or Bluetooth LE, Wi-Fi, Ethernet, USB, or other wired or wireless communications module. A pipe mapping system may also be used in conjunction with the disclosure herein in some embodiments to provide mapping functionality in conjunction with the locate operation.

In some embodiments, additional locator signal processing, such as through the use of quad-gradient coil signal detection and processing as described in, for example, co-assigned U.S. Utility patent application Ser. No. 13/676,989, filed Nov. 14, 2012, entitled QUAD-GRADIENT COILS FOR USE IN LOCATING SYSTEMS, may be used to provide enhanced sonde and/or line trace information. For example, the location of the push-cable (line trace circular field) and/or sonde (dipole field) may be further determined using gradient signals and corresponding processing as described in this application, which is incorporated by reference herein. For example, use of gradient information from the sonde magnetic field signal may be used in determining positional information of the sonde 320 within the pipe or cavity based on omnidirectional antenna arrays and quad-gradient antenna arrays.

Figure 2:
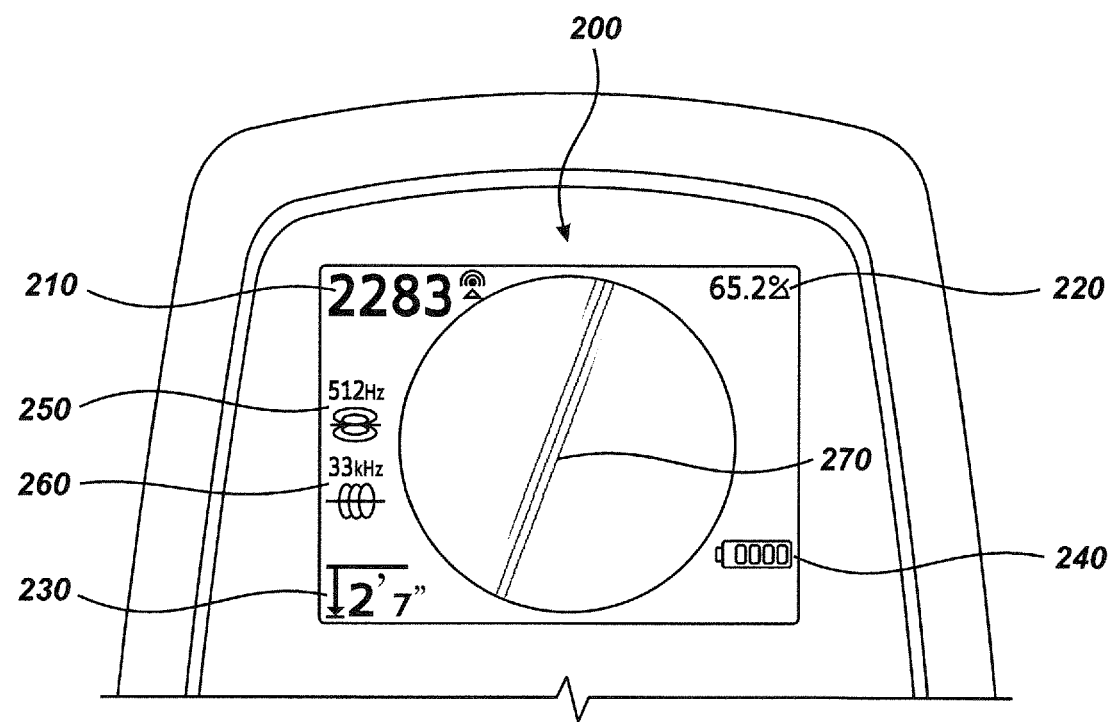
FIG. 2 is a prior art illustration of a user interface display.

Turning to FIG. 2, an output display device, such as user interface display 200, may present various graphical elements such as lines, symbols, icons, and/or data fields to communicate relevant information to a user. In the user interface display 200, icons or data fields such as a signal strength icon and data field 210, signal angle icon and data field 220, measured depth icon and data field 230, battery power icon and data field 240, sonde frequency icon and data field 250, and line trace frequency icon and data field 260 are shown (other icons and/or fewer icons may be shown in various embodiments). Examples of additional embodiments of a user interface as may be used in various locator device embodiments are shown and described with respect to FIGS. 4-6 and 14-16.

Figure 6:
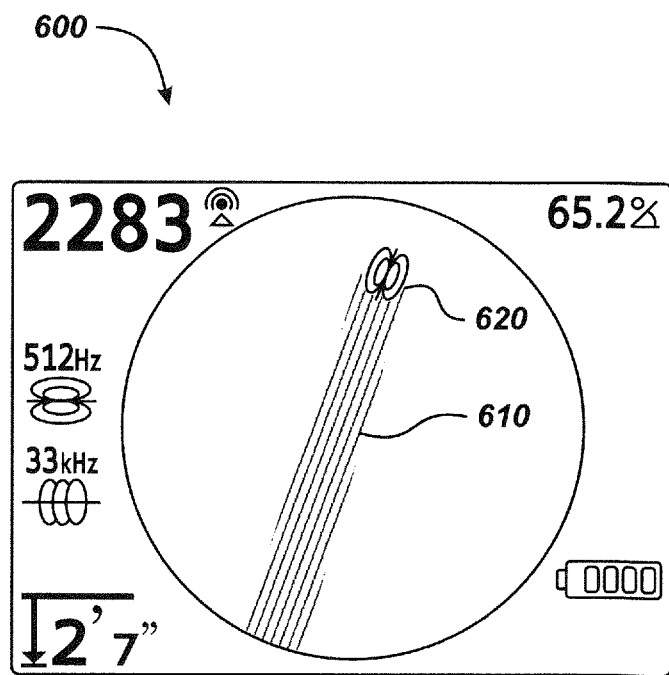
FIG. 6 is a user interface display embodiment showing an example of the trace line along position 'C' from FIG. 3.
Figure 16:
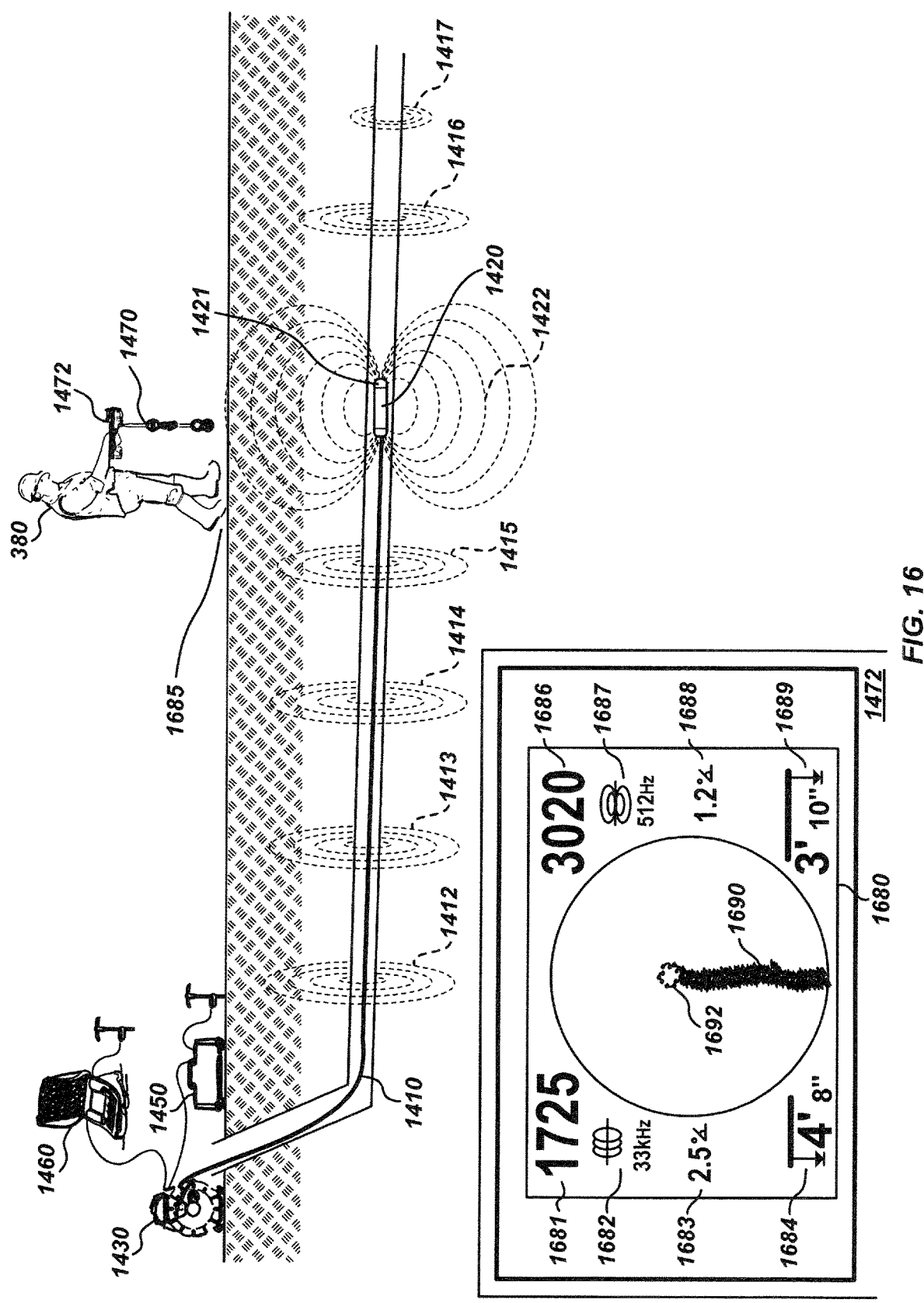

A display line 270 may be used to indicate the approximate axis of a push-cable deployed within a pipe or cavity as sensed by a locator device during a line trace operation. This display line may be used to provide a visual representation of the relative orientation of the push-cable in plan view as compared to the position of the operator (typically walking along a ground surface above the buried object). The display line 270 may also be configured to blur or "fuzz" displayed elements, such as the line, when the sensed fields of the line trace and sonde are measured and determined to not be orthogonal, and/or to provide additional information by using different colors, shading, dashing or "moving or crawling ant" type displays, and the like. The display line 270 may also be configured to blur as the locator device approaches the target sonde area, and the position of the sonde may be correspondingly highlighted or emphasized, such as shown in FIG. 6 and FIG. 16.

Additional lines or other symbols may be provided. For example, arrows or lines parallel to or orthogonal to magnetic field lines may be displayed in alternate embodiments. Visual displays may be enhanced through use of audible output, such as from speakers, headphones, buzzers, and the like. For example, audible outputs may be provided indicating information such as relative orientation of displayed line trace lines, audible indications of detection of sondes or line trace signals, audible proximity indications for line trace or sonde signals, and the like. A user interface display, in keeping with some aspects, may display all or some of the aforementioned icons and data fields and/or other icons, symbols, markers, or data fields in various embodiments. In some embodiments, additional icons may also be used to display more information. For example, information may be displayed regarding measurements of a sensed misalignment of the sonde and pipe axes, or measured tilt of a sonde from a horizontal orientation, or information on other sensed utilities, conductors, or objects.

Other measured or sensed parameters, such as rotation, speed, referenced position (e.g., via an inertial sensor), or other physical parameters may also be displayed and/or stored. Furthermore, an additional menu item may be included in the user interface display 200 allowing a user to select between line trace mode, sonde mode, and a simultaneous line trace and sonde mode in keeping with various aspects. For example, a user may be provided with an interface to allow selection of measurement and output of information based solely on line trace detection (e.g., measurement and processing of only line trace electromagnetic field signals), solely on sonde or dipole field measurement and processing, or a combined mode wherein the output information is generated and displayed based on both the line trace and sonde magnetic field signals, such as shown in FIGS. 4-6 and FIGS. 14-16.

Figure 3:
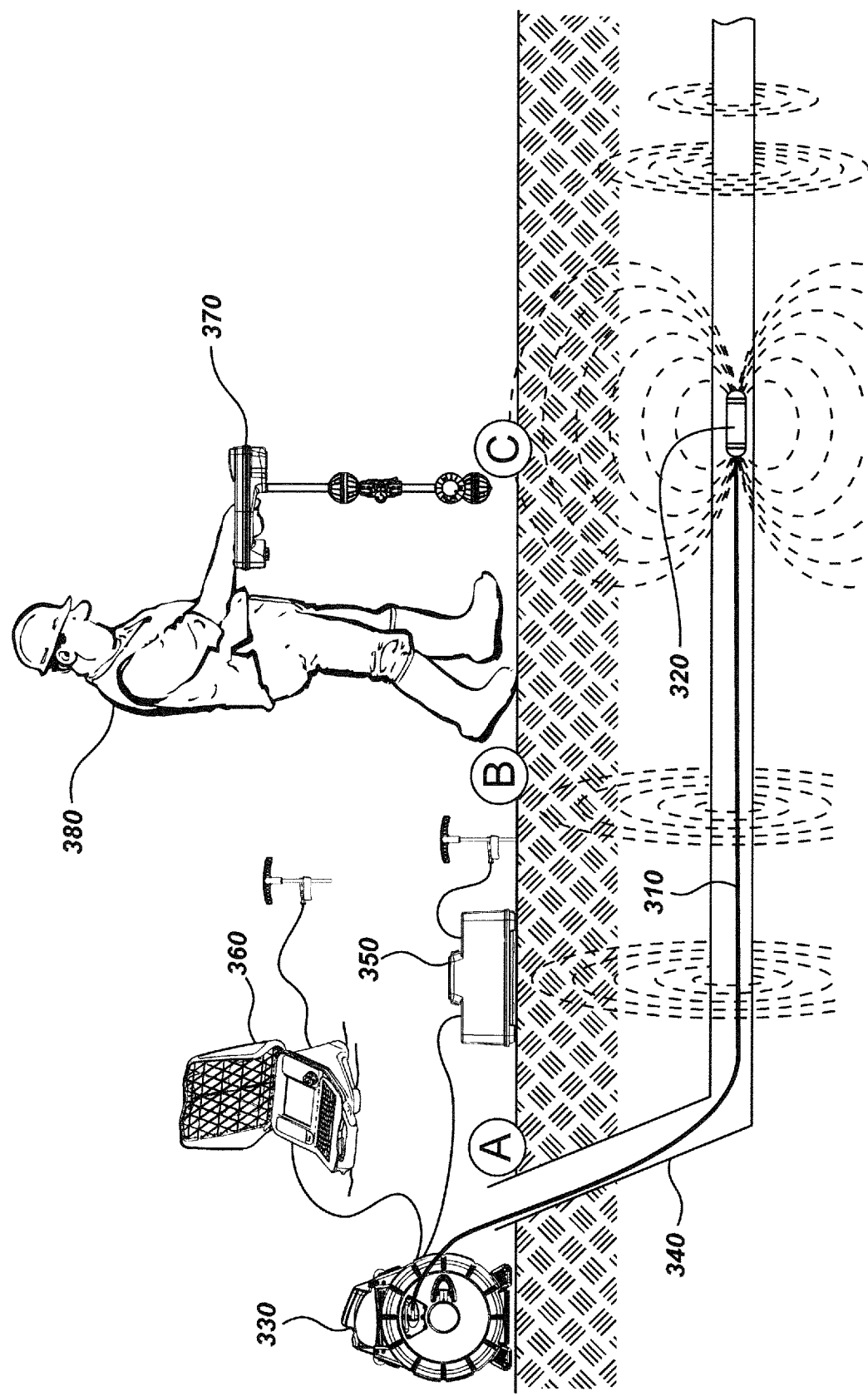
FIG. 3 is a side-view illustration of a user operating the handheld locator embodiment of the device of FIG. 1.

Turning to FIG. 3, an example buried pipe inspection ("line trace") operation is illustrated using a push-cable and sonde coupled to the distal end of the push-cable. An operator 380 may feed push-cable 310 with a sonde 320 from a cable reel 330 into a pipe 340. The push-cable 310 may be energized by a transmitter or line illuminator, such as the transmitter 350. A transmitter or line illuminator may also be built into a cable reel, such as cable reel 330, or a camera control unit such as CCU 360. In some embodiments, the sonde may be coupled to a push-cable along with elements for inspecting the pipe, or cleaning it, such as with cutting heads, jetters for pressurized cleaning, and the like.

Some embodiments may include camera heads disposed on the push-cable. For example, a camera head (not shown) may be disposed on a distal end of the push-cable, such as integral with or in the proximity of the sonde 320. Images or video streams from the camera head may be provided on a display of the CCU 360 and/or stored in a memory of the CCU 360 and/or transmitted to other electronic computing systems (not shown) such as notebook or tablet computers, cellular phones, or other devices. Additional information, such as information determined from the locator such as GPS or other location system coordinates, depth information, or other locator information may be provided to the CCU 360 or other electronic computing systems and integrated with the images or video.

By energizing the push-cable 310, the magnetic field about approximately the axis of the push-cable 310 may be sensed by a locator device 370 used by a user 380. This magnetic field will be of a line trace or concentric circular magnetic field configuration as shown in FIG. 3. As the push-cable 310 is situated within the pipe 340, such as to approximately share a central axis, the line trace may indicate the approximate location of the pipe 340. In some embodiments a conduit or pipe, such as pipe 340, or other object, when composed of conductive material, may also be illuminated by an applied signal, either directly or through capacitive or inductive coupling.

When the push-cable 310 is energized and the sonde 320 is energized, the resulting line trace and sonde magnetic fields may be substantially orthogonal to one another, with the sonde magnetic field being a dipole field as shown in FIG. 3. Magnetic field lines are illustrated as idealized dotted lines in FIG. 3, although in real world applications the actual field shapes may vary due to varying surface and subsurface conditions and other parameters. In this configuration, magnetic fields of two types may be generated from signals provided from the combined push-cable and sonde, and, as described subsequently herein, resulting information about the buried conduit being generated, displayed, stored, and/or transmitted based on both the line trace and sonde magnetic field signals.

For example, information associated with the buried object, such as information regarding the line trace and sonde signal may be simultaneously displayed on the user interface display or other output device of the locator device 370. The information may be provided so as to be easily understood by the user 380. In subsequent figures regarding positions A, B, and C, information regarding the line trace and sonde may be represented on a user interface display such that the displayed line of the line trace is increasingly defined as it is positioned away from the target sonde. Additional examples of other embodiments of such a user interface are illustrated in FIGS. 4-6 and 14-16.

In some embodiments, the locator device, such as locator device 370, may be configured to communicate wirelessly to the cable reel 330 and/or line illuminator 350 and/or CCU 360 and/or other device or system (not shown) such that a single command from the locator device 370 may initiate the simultaneous sonde and line trace mode. This may be done using one or more wired or wireless communication modules. In addition, data may be communicated between the locator and CCU 360 or other device or system, such as position/location information of the user, which may be determined by GPS or other location systems, information about the push-cable and/or sonde, such as depth, signal strength, magnetic field data, orientation of the push-cable or sonde, and the like. This information may be combined in the CCU 360 or other systems with information provided from the push-cable, such as images, video, sensor data from a camera head or sonde, and the like. For example, images or videos from a camera head integral with or in the proximity of the sonde may be combined with location information provided from the locator, such as from a GPS module therein, and/or with other locator information such as depth, camera head orientation, signal strength, magnetic field angles, and the like. This information may be displayed and/or stored in conjunction with the images or video for future reference in the CCU 360, cable reel 330, transmitter 350, and or may be communicated to other electronic computing systems (not shown) such as notebook computers, tablets, cellular phones, and the like.

If user 380 moves further beyond position C of FIG. 3, the line trace magnetic field signals will tend to drop off as shown, and corresponding depth information may be provided on the display as increasing. Alternately, signal processing of the combination of sonde signals when the user is in the vicinity of being above the sonde, combined with received line trace signals and/or amplitude changes, can be sensed to determine that the user is near the distal end of the push-cable, which may be presented on the user interface in some embodiments.

Figure 4:
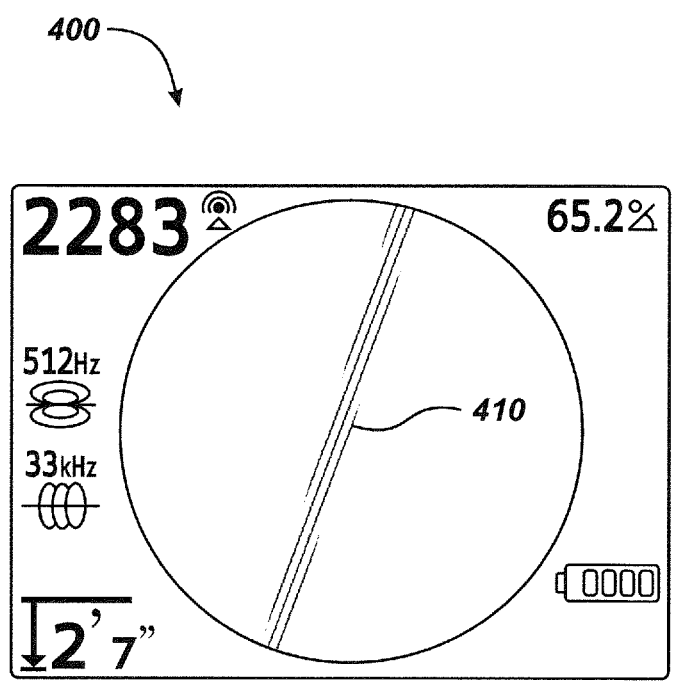
FIG. 4 is a user interface display embodiment showing an example of the trace line along position 'A' from FIG. 3.
Figure 5:
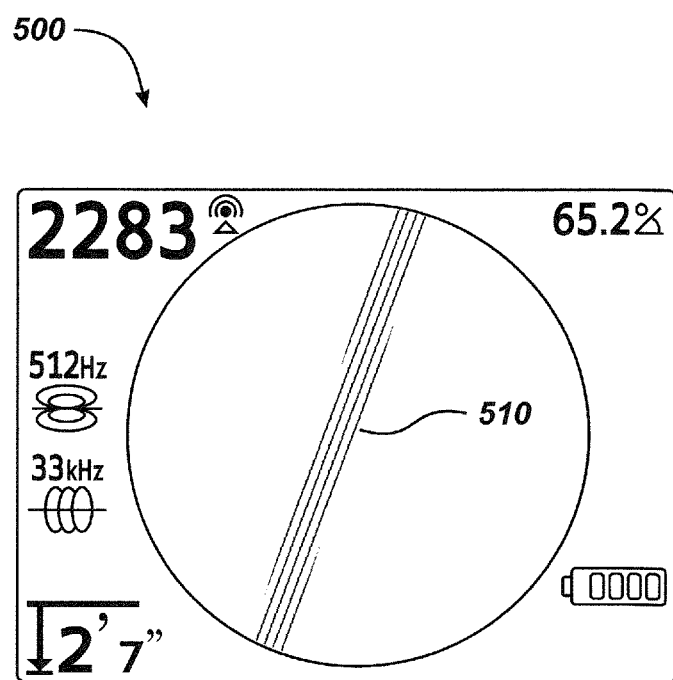
FIG. 5 is a user interface display embodiment showing an example of the trace line along position 'B' from FIG. 3.

FIGS. 4, 5, and 6 illustrate example display embodiments illustrating varying degrees or sharpness or blurring/fuzziness of the displayed elements as a function of distance from a target sonde location. For example, FIG. 4 shows a user interface display 400 as the locator device is near position 'A' of FIG. 3. In the user interface display 400, the display line 410, representing a line trace, is shown mostly well defined or sharp as position 'A' may be distant from the target sonde location.

In FIG. 5, an illustration of a user interface display 500 as the locator device is moved near position 'B' from FIG. 3 is shown. In the user interface display 500, the display line 510 representing the line trace is shown as more blurred than the display line 410 of position 'A' in FIG. 4, as position 'B' is closer but has still not reached the target sonde location.

In FIG. 6, an illustration of a user interface display 600 as the locator device is near position 'C' from FIG. 3 is shown. In the user interface display 600, the locator device is now located near the target sonde and the display line 610 representing the line trace may become more blurred than that of position 'A' represented in FIG. 4 or position 'B' as represented in FIG. 5. In addition, a sonde icon 620 has appeared showing the target location. Although the examples of FIGS. 4-6 shown one way of illustrating locations of line traces and sondes, in other embodiments various alternate ways of displaying this information may also be used, such as reversing the sharpness/fuzziness, using different shading, colors, textures, and the line, or using other methods known or developed in the graphical display arts. Additional examples of line trace operations and corresponding user interface embodiments are described subsequently herein with respect to FIGS. 14-16.

Figure 7:
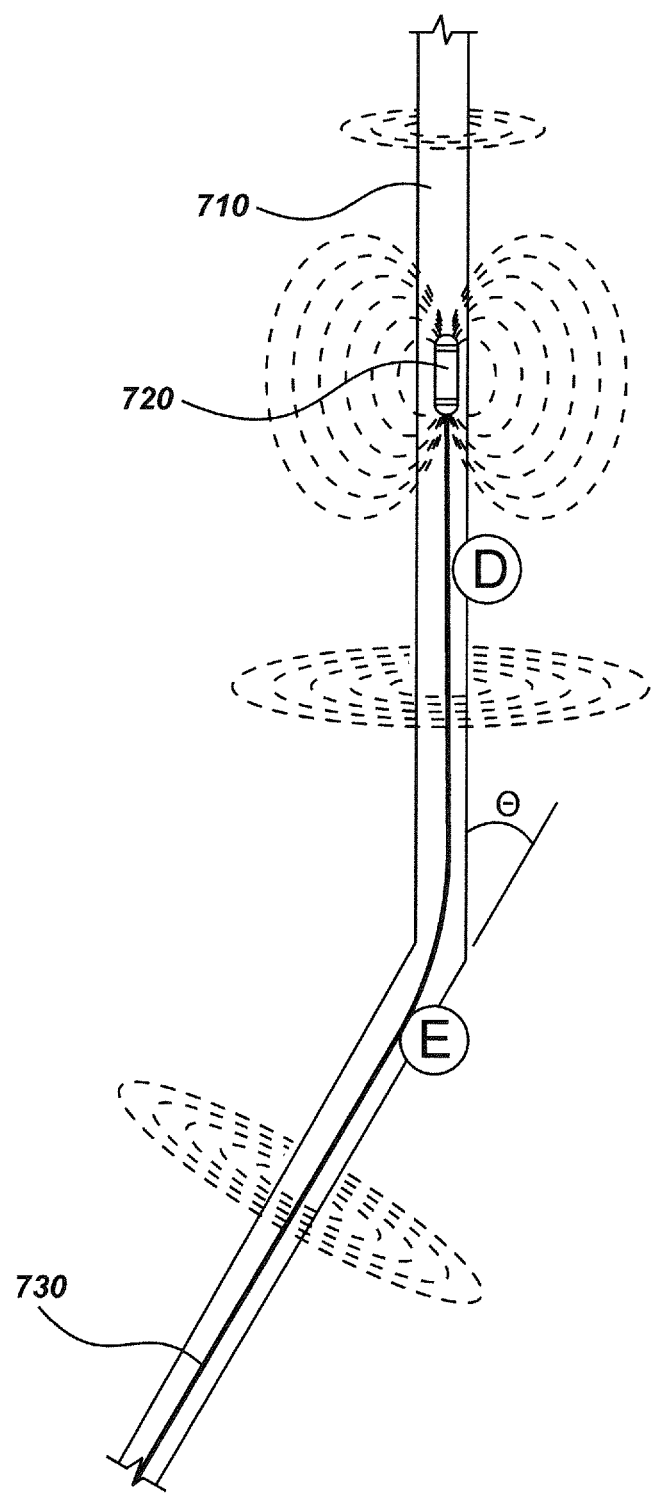
FIG. 7 is a top-view illustration of a bent pipe showing field lines of the sonde and energized push-cable within a pipe.

In some applications, buried pipes, conduits, cavities, etc., may have bends or turns. These may also be sensed using a locator system as described herein. For example, as shown in FIG. 7, a bent pipe 710 is illustrated with a sonde 720 positioned behind the bend on a push-cable 730. In subsequent figures regarding positions D and E, information regarding a scenario where a sensed misalignment in the pipe and sonde axes may be represented on a user interface display. Furthermore, calculation of angle Theta (Θ) may be determined from the measured misalignment of the pipe and sonde axes and displayed on the user interface display.

Figure 8:
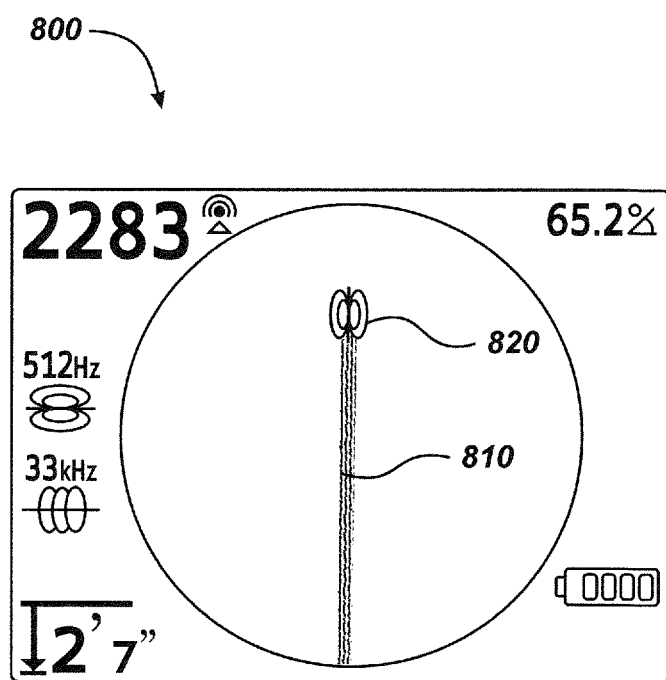
FIG. 8 is a user interface display embodiment indicating the information along position 'D' of FIG. 7.
Figure 9:
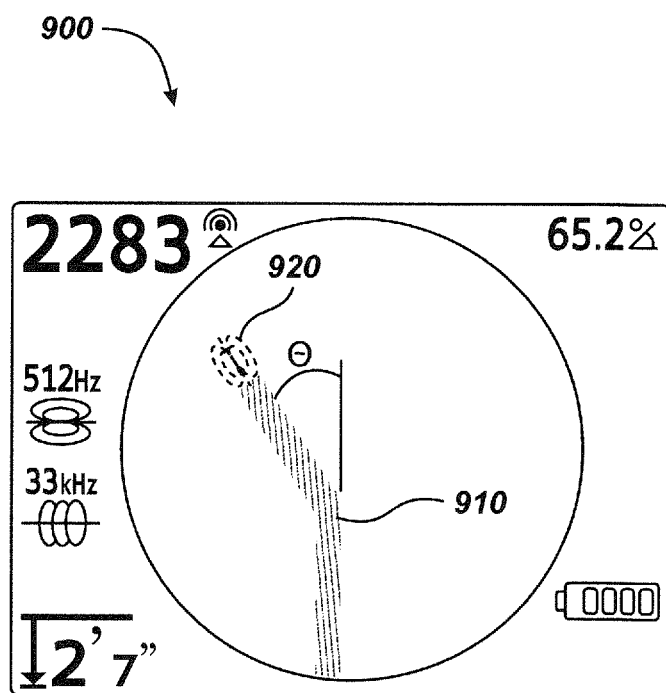
FIG. 9 is a user interface display embodiment indicating the information along position 'E' of FIG. 7.

In FIGS. 8 and 9, a visual comparison between the graphical representation of position 'D' of FIG. 8 and the graphical representation of position 'E' of FIG. 9 is shown. In position 'D,' the sonde 720 axis and sensed axis of the bent pipe 710 may be largely aligned with one another, which may be indicated by an output such as shown in user interface display 800 showing a defined display line 810 and sonde icon 820. In contrast, the graphical representation of position 'E' as illustrated on the user interface display 900 shows visual ambiguity in the display line 910 and sonde icon 920 corresponding to the misalignment of the bent pipe 710 and sonde 720 axes. In some embodiments, such ambiguity may also be represented, for instance, by changes of color, line weight, shading, texture, or line type on the user interface. Audible indicators and/or other visual indicators, tactile indicators, or other output devices may also be used in various embodiments.

Figure 10:
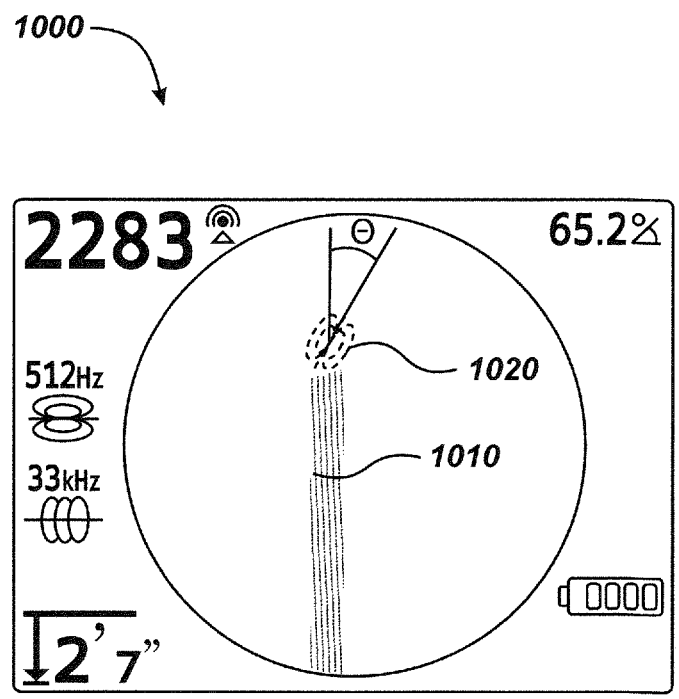
FIG. 10 is a user interface display embodiment showing the sonde icon when the axis of the line trace signal and the sonde signal are substantially misaligned.

Turning to FIG. 10, in scenarios where the trace signal and the sonde signal are substantially misaligned, the ambiguity of the sonde and pipe position may be represented graphically on a user interface display such as the user interface display 1000. For instance, in FIG. 10 this ambiguity may be represented with a blurred or fuzzy display line 1010 and blurred or fuzzy sonde icon 1020. Other methods for providing an output indication of this misalignment may also be used in various embodiments.

Figure 11A:
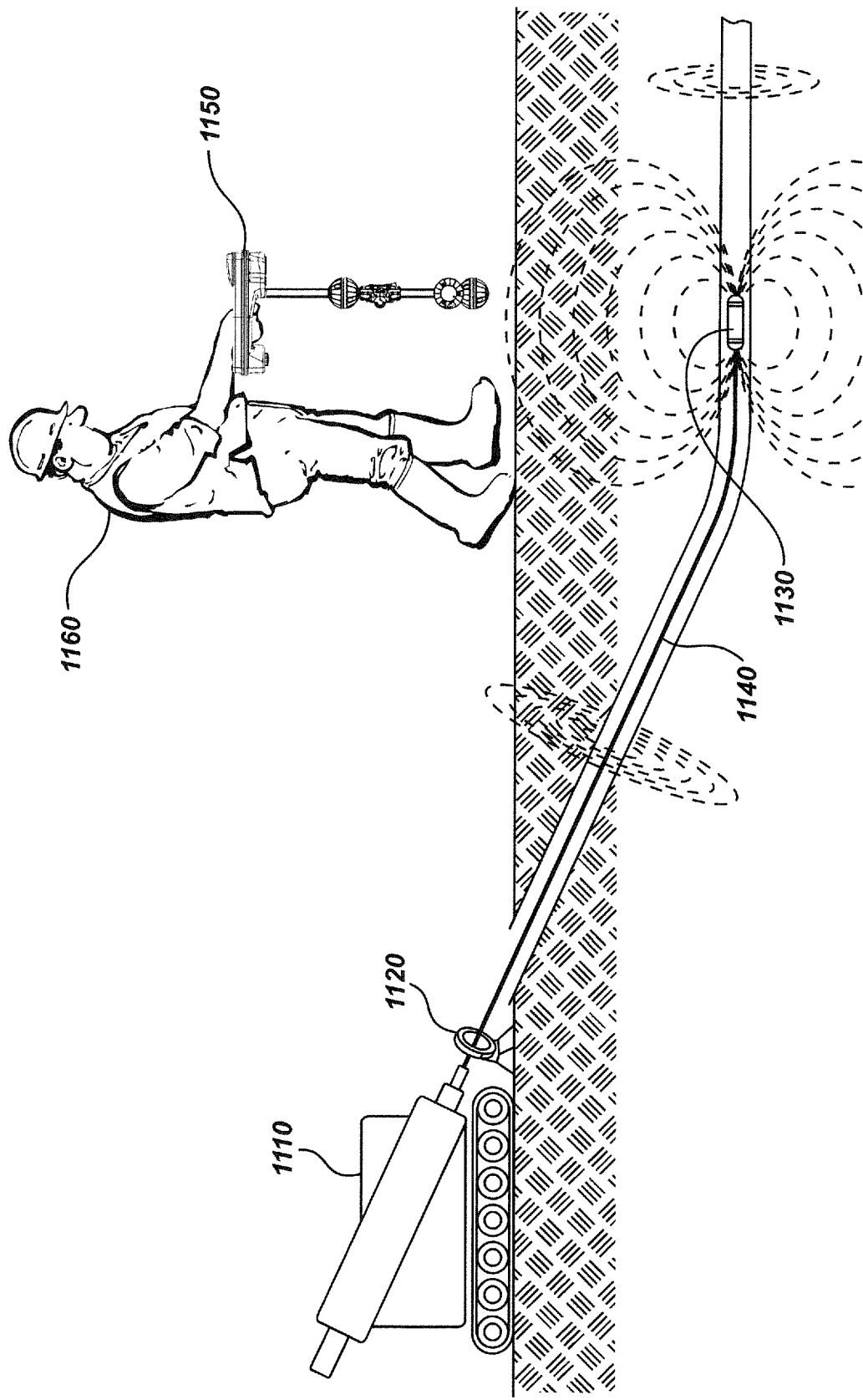
FIG. 11A is an illustration of an example horizontal drilling operation simultaneously using both sonde and trace line locating.

Turning to FIG. 11A, the simultaneous use of line trace and sonde may be applicable in industries besides utility locating, such as, for example, horizontal drilling applications. In these applications, horizontal drilling may be done instead of trenching to reduce the required cost and/or work and/or damaged to the ground area or surfaces. An example of such an operation is shown in FIG. 11A, where a horizontal drilling rig 1110 is illustrated with an inductive clamp 1120 positioned about a drill string 1140 of the horizontal drilling rig 1110. The inductive clamp 1120 may be configured to energize the drill string 1140. A sonde 1130 may be positioned near the end of the drill string 1140. The line trace and sonde signal may be simultaneously displayed on locator device 1150 for the user 1160 and used to provide information regarding, for instance, the progress of the drilling job and the location of the drill underground.

Figure 11B:
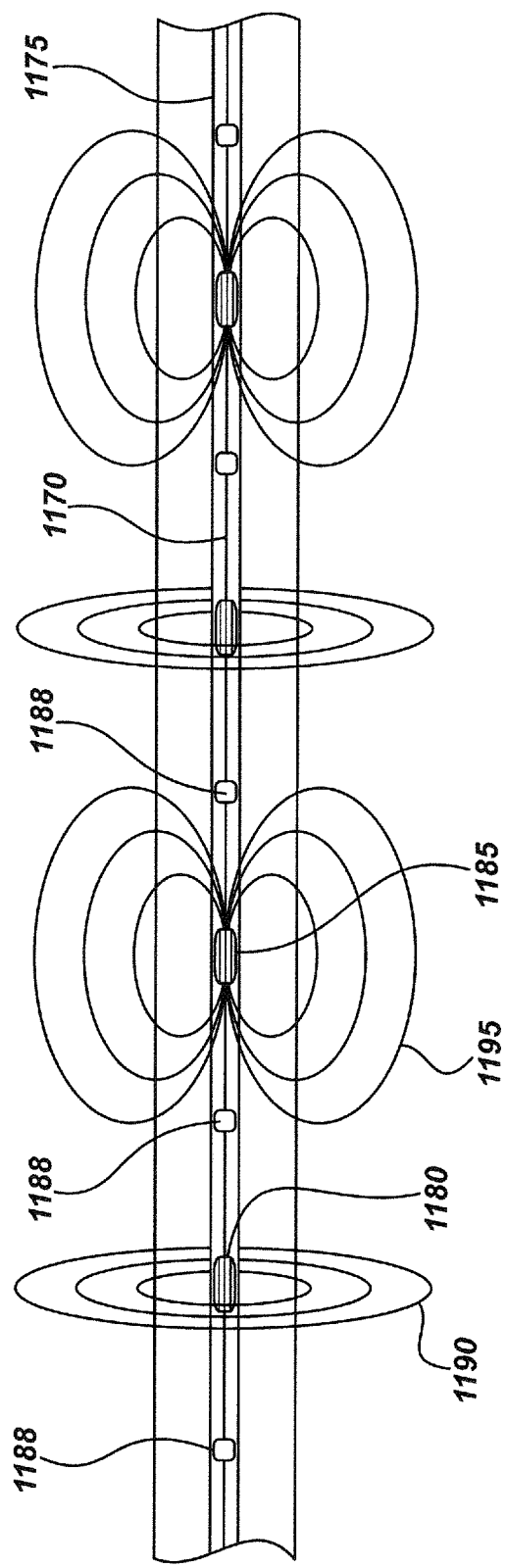
FIG. 11B is a tracer wire embodiment.

Turning to FIG. 11B, a separate trace wire 1170 may be secured to a push-cable, drill string, or other cabling such as the push-cable 1175 in some embodiments. A series of dipole nodes such as the horizontal axis RFID nodes 1180 and/or the vertical axis RFID nodes 1185 may exist along the trace wire 1170. The field emitted by horizontal axis RFID nodes 1180 may have a dipole axis aligned with the axis of the push-cable 1175. The field emitted vertical axis RFID nodes 1185 may have a dipole axis perpendicular to the axis of the push-cable 1175. In some embodiments, only nodes emitting fields with axes aligned with the axis of its attached push-cable, drill string, or other cabling may be used.

In other embodiments, only nodes emitting fields with axes perpendicular with the axis of its attached push-cable, drill string, or other cabling may be used. In yet other embodiments, any number or combination of nodes with emitting variously oriented fields may be used. The RFID nodes 1180 and 1185 may transmit back at different frequencies than the induction field. For instance, the induction field may be 440 kHz while the response from the RFID nodes 1180 and 1185 may be at 55 kHz. The sealed and/or grounded ends 1188 on either side of each RFID node 1180 and/or 1185 may allow the trace wire 1170 connected to each node operate as an antenna. The ends 1188 may utilize conductive plastics and/or rubbers to establish these ground points. In some embodiments, multiple dipole nodes may secure to a continuous trace wire rather than the segmented trace wire 1170 as illustrated in FIG. 11B.

Figure 12:
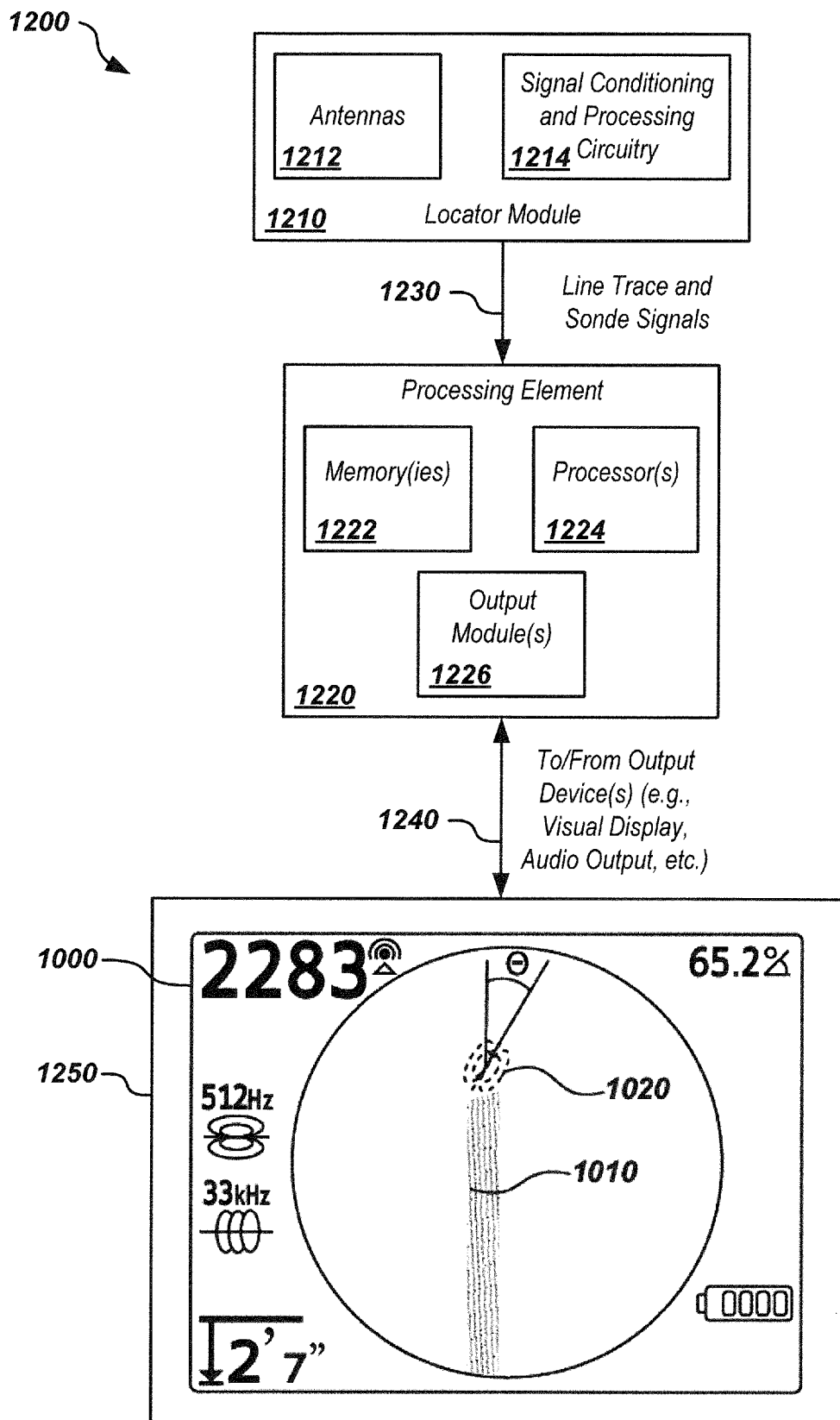
FIG. 12 illustrates details of an embodiment of circuit modules for use in processing locator signals to provide dual sensed output information.

FIG. 12 illustrates simplified details of an embodiment of a buried object locator system 1200 configured to provide a dual sensed output as described herein. For purposes of clarity, various details of the locator system are omitted; however, additional details of various components and signal processing that can be used in locator system 1200 are described in the other patents and publications incorporated herein. Moreover, the illustrated elements of FIG. 12 may be combined or separated into distinct components or modules in alternate embodiments while performing similar functionality.

As shown in FIG. 12, locator system 1200 may include a locator module 1210, a processing element/module 1220, and a visual display device 1250, illustrating example display 1000 as shown in FIG. 10 on the display. These elements may be combined in various implementations, such as, for example, combining processing element 1220 with locator module 1210 so that processing element 1220 can perform additional locator processing functions.

Figure 14:
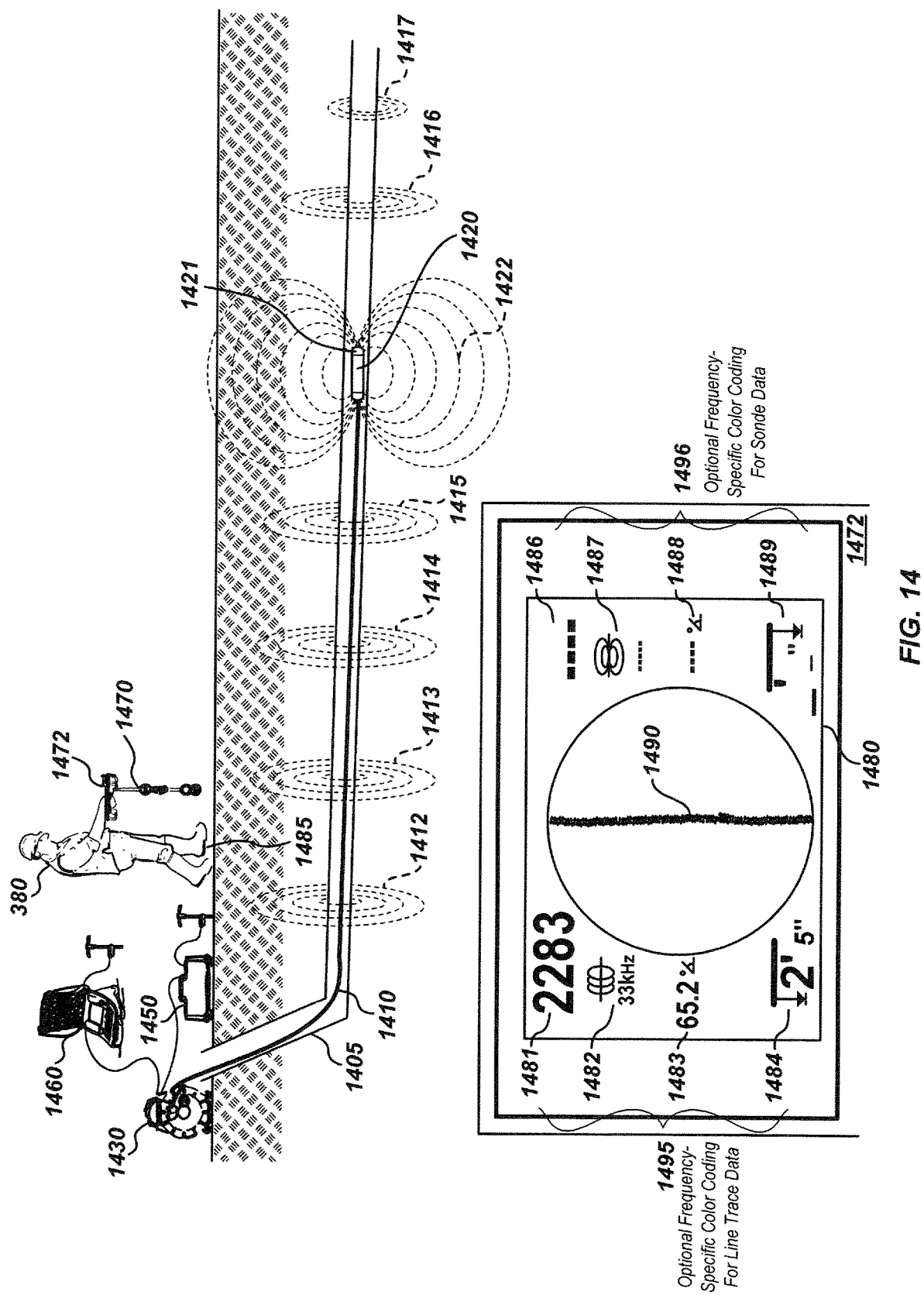
FIGS. 14-16 illustrates details of a locate operation and corresponding user interface embodiments with example data as an operator moves above a buried pipe.
Figure 15:
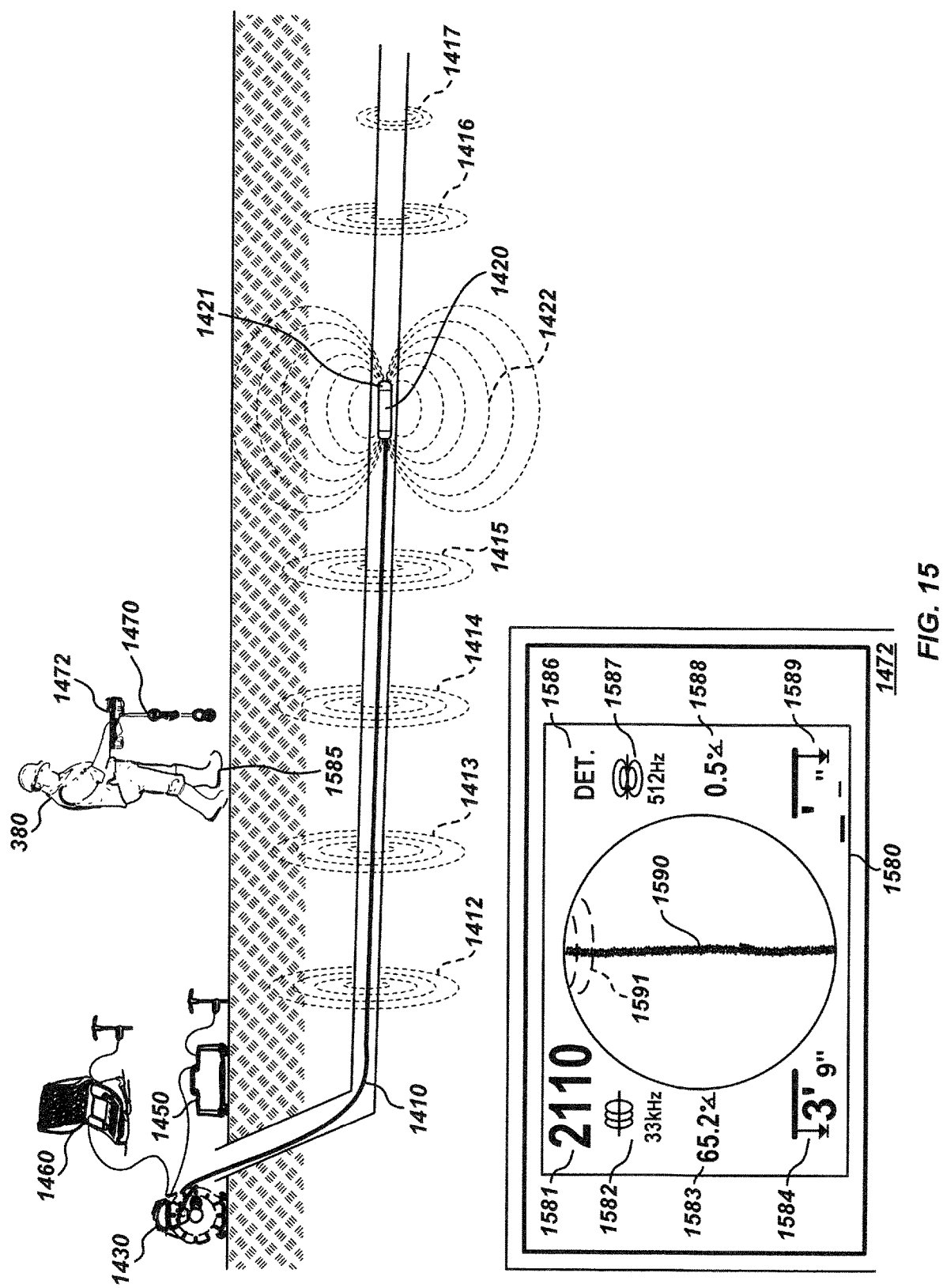

Antennas 1212 and signal conditioning and processing circuitry 1214 may be used to receive sonde signals and line trace signals from magnetic fields generated by the buried object and a corresponding sonde inserted therein. These may include gradient antennas for sensing and providing gradient signals and/or omnidirectional antenna arrays for providing multi-dimensional magnetic field signals to processing element 1214. Output signals from the locator module 1210 corresponding to the sonde and line trace signals may be provided to the processing element 1220, where they may be used in combination to generate information associated with the buried object for output on the display device 1250, such as is described with respect to FIGS. 4-6 and 8-10. A similar configuration may be used to generate displays as illustrated in FIGS. 14-16.

Processing element 1220 may include one or more processors 1224, one or more memories or memory spaces 1222, which may comprise single or multiple physical memory devices or modules, as well as one or more output modules 1226, which may be signal conversion modules (e.g., to USB, Firewire, Ethernet, etc.), video output display control modules, audio output modules, or other modules for generating output signals in an appropriate format for an output device such as an audio output device or video display (e.g., video display 1250 as shown). Display 1250 may be an LCD display, LED display (e.g., OLED), or other display device which may be monochrome or colored, may include touch screen elements, and may be further combined with audible outputs from speakers or other audio devices, and/or other visual outputs such as from separate LEDs and the like. As shown in FIG. 12, a representation of both sonde and line trace information may be provided on display 1250 based on received sonde magnetic field signals and line trace magnetic field signals, which may be provided from a combined sonde and push-cable.

Figure 13:
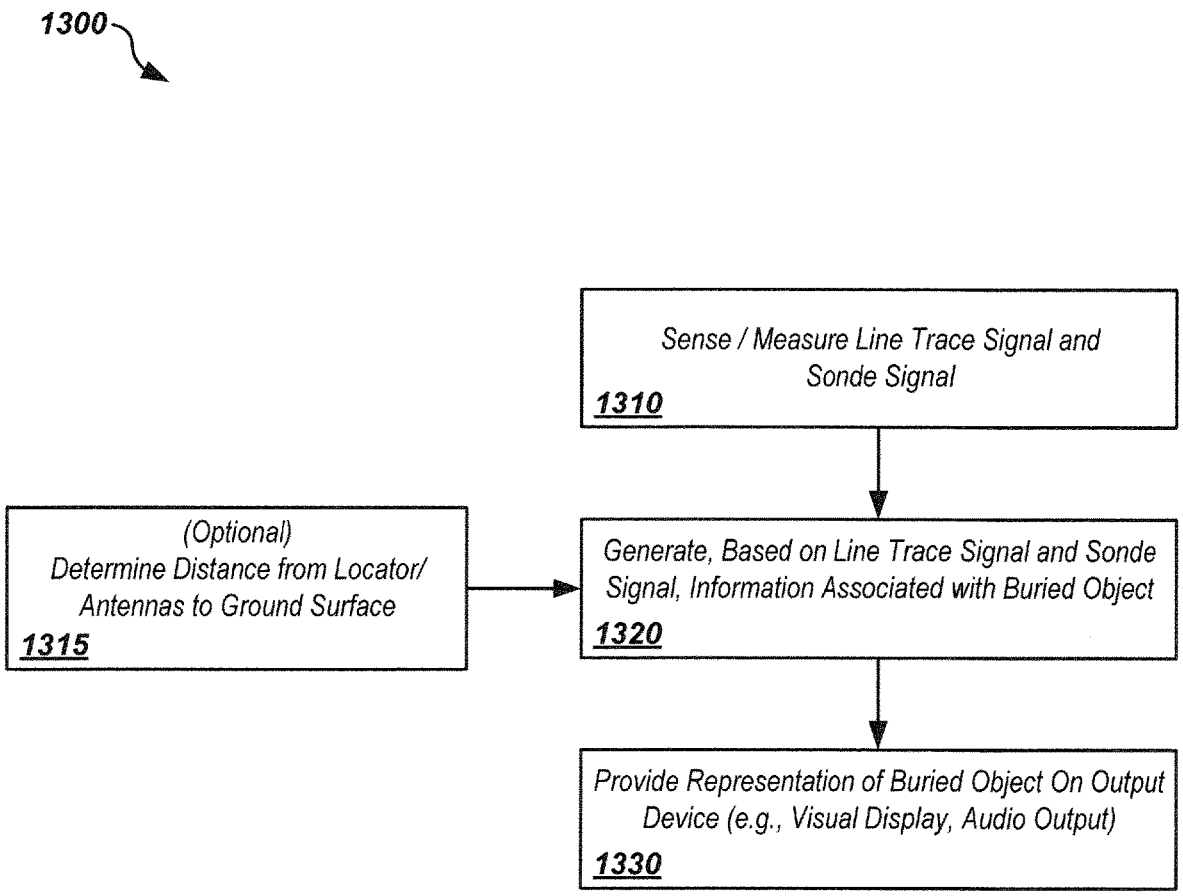
FIG. 13 illustrates details of an embodiment of a method for providing dual sensed output information.

FIG. 13 illustrates details of an embodiment of a process 1300 for providing buried object information, such as information associated with a position or location of a buried object and/or other objects such as sondes, locators, and the like. Process 1300 may be implemented, in whole or in part, in a processing element such as shown in FIG. 12.

Process 1300 may begin at stage 1310, where magnetic field signals measured/sensed from magnetic fields from a line trace and a sonde may be generated. The signals may then be sent, such as from a locator module to a processing element, for dual sense processing. At stage 1320, information associated with the buried object may be generated based in part on the line trace signal and the sonde signal. At stage 1330 a representation of the buried object may be provided, such as on a visual display device or audio output device, based on the information associated with the buried object, such as shown in FIG. 4-6, 8-10, or 14-16. The representation may include display of the location, position, orientation, or other information about the buried object and/or information about sondes positioned within the buried object and/or location between a locator and locator elements such as antennas and the sondes or buried objects. An optional stage 1315 may be included to determine a distance between a locator device element, such as an antenna, and the ground surface. The distance information may be provided for use in determining the information associated with the buried object.

The output device may be, for example, an audible output device. Alternately, or in addition, the output device may be a visual display device. The information associated with the buried object may include information associated with a location, position, and/or orientation of the buried object and/or other devices such as sondes disposed within the buried object or a cavity or other area being inspected. The information may be determined relative to a location of a user and buried object locator or other reference.

The information associated with the location, position, and/or orientation may, for example, be provided as a visual display, an audible output and/or a combination display and output. The visual display of the information may include blurring, fuzzing, dashing, or other visual representations of the location and/or accuracy of the measurement or signal strength or noise. The blurring may be based on a determined distance to the sonde and/or orientation of the sonde relative to the buried object locator or locator antennas. The visual display of the information may include a display of information associated with a tilt or rotation of the sonde and/or other positional, orientation, or motion information associated with the sonde. The visual display of the information may include a display of information associated with a non-orthogonality between the sonde signal and the line trace signal. The information associated with the buried object may be information associated with a position of the sonde within the buried object. Information from both the line trace signal and the sonde signal may be used to determine the position of the sonde within the buried object. The visual display may include one or more icons and/or one or more data fields associated with the sonde and line trace signals, such as field strength data, frequency data, angle data, depth data, orientation/rotation data, and/or other data or information.

The information associated with the buried object may be information associated with a difference in alignment between the sonde axis and line trace axis. The process 1300 may further include measuring the line trace and providing information associated with the difference in alignment on a display device. The information associated with the buried object may be stored in a memory, database, or other storage device or system. The process may include displaying a sonde target position at the end of a displayed line trace line on the output device.

The sonde position may, for example, be displayed as blurred or made fuzzy or dashed or made in a motion representation such as a "moving or crawling ant" display on the output display device, such as along a sonde equator axis. A determination may be made as to whether the axes of the sonde and line trace are parallel. The blurring may be provided to indicate positional uncertainty when the axis of the trace and the axis of the sonde are determined to not be parallel. The sonde location may, for example, be displayed as an icon on the output device. The sonde icon may be displayed along a line trace axis in a blurred fashion when the sonde is tilted from horizontal.

The process 1300 may further include, for example, determining or measuring a distance between the ground surface and a bottom locator receiving antenna. The process may further include determining, based in part on the measured distance and in part based on received sonde information, a pitch or tilt angle of the sonde.

Attention is now directed to FIGS. 14-16 which illustrate another example buried utility locate operation and corresponding user interfaces as an operator moves above ground over a buried pipe or other cavity 1405 in which a push-cable 1410 and coupled sonde 1420 are deployed. The various elements shown, such as transmitter 1450, cable reel 1430, CCU 1460 and locator 1470 may correspond with similar elements as shown in FIG. 3.

FIG. 14 illustrates a user/operator 380 at a first position 1485 relative to buried pipe 1405 in which a push-cable 1410, which may correspond with push-cable 310 of FIG. 1, is deployed. FIG. 15 illustrates the user 380 at a second position 1585 along the pipe 1405 and FIG. 16 illustrates user 380 at a third position 1685. In this example, the user 380 operates locator 1470 while moving along the ground, and a sonde 1420 coupled to a push-cable 1410 is positioned within the pipe 1405 as shown (similarly to the example shown in FIG. 3). Information about the locate operation is displayed on display 1472 of the locator, and this information may also optionally be transmitted from the locator 1472 to the CCU 1460, cable reel 1430, transmitter 1450, or other electronic computing systems (not shown).

The sonde 1420 may be deployed within or in proximity of a camera head 1421 which may include one more imaging elements, along with lighting, processing elements, and the like. The camera head may capture images or video streams of the interior of the pipe 1405 or other cavity being inspected, and the images or video may be sent via conductors in push-cable 1410 to the cable reel 1430 and/or CCU 1460. Examples of camera heads and associated camera control units as may be used in various embodiments are described in, for example, co-assigned U.S. patent application Ser. No. 13/775,066, filed Feb. 22, 2013, entitled THERMAL EXTRACTION ARCHITECTURE FOR CAMERA HEADS, INSPECTION SYSTEMS, AND OTHER DEVICES AND SYSTEMS, co-assigned U.S. patent application Ser. No. 13/774,351, filed Feb. 22, 2013, entitled DOCKABLE TRIPODAL CAMERA CONTROL UNIT, as well as co-assigned U.S. patent application Ser. No. 13/754,767, filed Jan. 30, 2013, entitled ADJUSTABLE VARIABLE RESOLUTION INSPECTION SYSTEMS AND METHODS. The content of each of these applications is incorporated by reference herein.

In operation, camera control unit 1460 may be communicatively coupled to push-cable 1410, which may be wound on, or deployed from, cable reel 1430. A transmitter 1450 may also be coupled to the cable reel to generate line tracing currents in the push-cable 1410. The sonde may be self-powered (e.g., by internal batteries), or may be powered via power supplied by the push-cable 1410 or separate power cables. In some embodiments, the transmitter 1450 may be incorporated within the cable reel 1430 and/or camera control unit 1460 rather than be a separate unit as shown in FIGS. 14-16.

Two different magnetic field types may be generated by push-cable 1410 as shown. A line trace magnetic field, illustrated as concentrically circular magnetic field lines 1412-1417 may be generated about the axial length of the push-cable 1410, while a magnetic dipole field 1422 may be generated about sonde 1420. Examples of various details of line trace signal processing and sonde signal generation and processing as may be used in locator embodiments in conjunction with the disclosures herein are described in, for example, co-assigned United States patents including U.S. Pat. No. 7,009,399, issued Mar. 7, 2006, entitled OMNIDIRECTIONAL SONDE AND LINE LOCATOR, U.S. Pat. No. 7,443,154, issued Oct. 28, 2008, entitled MULTI-SENSOR MAPPING OMNIDIRECTIONAL SONDE AND LINE LOCATOR, U.S. Pat. No. 7,619,516, issued Nov. 19, 2009, entitled SINGLE AND MULTI-TRACE OMNIDIRECATIONAL SONDE AND LINE LOCATORS AND TRANSMITTER USED THEREWITH, as well as U.S. Pat. No. 6,496,008, issued Dec. 17, 2002, entitled FLUX-PLANE LOCATING IN AN UNDERGROUND DRILLING SYSTEM, and U.S. Pat. No. 4,710,708, issued Dec. 1, 1987, entitled METHOD AND APPARATUS EMPLOYING RECEIVED INDEPENDENT MAGNETIC FIELD COMPONENTS OF A TRANSMITTER ALTERNATING MAGNETIC FIELD FOR DETERMINING LOCATION. The content of each of these patents is incorporated by reference herein.

As shown in FIG. 14, when user 380 is moving along the ground at position 1485, user interface 1480 may present various information, such as in the form of symbols, icons, data fields, and the like related to the line tracing operation. For example, user interface 1480 may include line trace data and icons, shown in this example on the left side of the display, as well as sonde data and icons, shown on the right side. The line trace data may include, for example, signal strength data 1481, such as a numeric signal strength value as shown and/or other data such as a bar-type level (not shown), lights or dots, or other outputs corresponding to a signal strength level. Display 1480 may include a line trace symbol or icon and frequency information 1482, which may be presented as shown or in other equivalent formats. Display 1480 may include magnetic field or buried object location angular information 1483 and icon, which may provide user information related to the angle of the received magnetic field at the current user position. Display 1480 may include depth information 1484 and icons, such as a symbol and/or numeric depth information based on the received line trace signals. Other information (not shown in FIG. 14) related to the line tracing operation may also be shown in various embodiments, and the formatting and relative position and orientation of the presented information may vary in alternate embodiments.

In some embodiments, colors and/or shading, graying-out, dashing, or other distinguishing graphical features may be used for the various display elements shown in the user interface 1480. For example, in some embodiments, the frequency of the received signal, and associated data, may be presented in different colors or shading or graying-out, which may be selected as representative of the relative frequency (or lack of signal). For example, frequency specific color coding 1495 and 1496 may be used to illustrate the frequencies of the signals received from the line tracing and sonde. In one exemplary embodiment, the frequency may be selected to correspond with visible light colors such that lower frequencies are represented by colors towards the red end of the spectrum and higher frequencies are represented by colors near the blue or violet end of the color spectrum so that the electromagnetic field frequency range corresponds to the frequency range of the visible light spectrum.

Similar data fields may be provided for data generated based on received sonde magnetic field signals. For example, signal strength field 1486, symbol/frequency field 1487 and sonde icon, angle field 1488 and angle icon, and depth field 1489 and depth icon may be presented for data based on sonde signal measurements as shown on the right side of user interface 1480. If one or the other signal types (line trace or sonde) is not being received or is weak or may otherwise not be presented, that portion of the display may be shaded, dashed, grayed-out or blanked out, changed in color, or otherwise be distinguished. For example, in the example embodiment of FIG. 14, at position 1485 the sonde signal 1422 may be too weak or noisy to be displayed with an acceptable degree of accuracy, and the corresponding fields may be dashed as shown or lightened or grayed out.

The central portion of user interface 1480 (or in other embodiments, alternate areas of the display) may provide a visual representation of the tracing operation including a representation 1490 of the push-cable 1410 or corresponding line trace magnetic field signals relative to the orientation of the operator (e.g., as shown the line is co-linear with the user's position such that moving directly forward will allow the user to follow the line directly above it). Offsets to the left or right side, angular offsets, and the like may be illustrated by shifting and/or rotating the relative position of the line 1490 on the display depending on where the user 380 is located relative to the line being traced. Additional display features, such as shading or dashing of the line 1490, making the display fuzzier or sharper, providing a "moving or crawling ant" type display, using varying colors, and the like may be used to represent characteristics such as signal strength, noise, signal quality, signals from buried power or other utilities, and the like.

As the user 380 moves towards the sonde 1420, at some point magnetic field signals from the sonde may be sufficient to provide user information on the display 1472. For, example, as shown in FIG. 15, if the buried pipe gets deeper by moving further underground along its length (or if the surface slopes upward) signal strength from the line trace signals 1581 may decrease and displayed depth 1584 may increase on user interface 1580. In addition, a display indication of initial detection of the sonde may be provided, such as in the form of dashed ovals 1591 or other audible or visual indications that the sonde has been detected. This may be done to provide the operator an initial indication that the sonde is being approached, even if the received signal is too weak to provide accurate information or is too far away to be represented on the display.

For example, upon initial detection of the sonde, signal strength of the sonde signal may be provided or, as shown in FIG. 15, a visual indication of signal detection ("DET.") in field 1586 of user interface 1580, or other indication that the sonde has been detected, may be provided visually and/or audibly. Additional information associated with the detected sonde signal may be provided in fields 1587-1589, such as frequency, angle, depth, and/or other information or may be blanked or dashed out until adequate signals are received.

As the user 380 moves further along the line, the user interface may be updated to further illustrate the relative location of the sonde and line. At some point as the user follows the line at position 1685, the sonde 1220 will be below the user 380. The location of the sonde and associated push-cable may then be provided to the user as a combination display of information on user interface 1680 based on the line tracing signal 1415, such as in the form of graphical element 1690, and information based on the sonde signal 1422, such as in the form of graphical element 1692. Corresponding data may be presented in fields 1681-1684 for the line trace data and fields 1686-1689 for the sonde fields. As described previously with respect to FIG. 6, the line trace representation may be blurred, fuzzed, or dashed when the sonde signal reaches a certain level, such as when the user is directly over or close to being above the sonde.

In one or more exemplary embodiments, the functions, methods and processes described herein may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed in one or more processing elements or modules including a general purpose processor, special purpose processor, digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The processing element may further include memory, analog or digital devices, I/O devices, A/D or D/A converters, and/or other electronic or optical devices or components.

The steps or stages of a method, process or algorithm in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the present invention is not intended to be limited to the specific aspects shown, but is to be accorded the full scope consistent with the disclosure herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the appended claims and their equivalents.

We claim:

1. A system for locating buried objects, comprising:
a push-cable including an electrical conductor;
a sonde mechanically coupled to the push-cable for generating a dipole magnetic field sonde signal at a first frequency;
a transmitter electrically coupled to the push-cable electrical conductor for providing a current signal to the push-cable to generate a line trace current signal, wherein a circular magnetic field signal is generated from the line trace current signal flowing in the push-cable;
at a second frequency different from the first frequency, resulting from current flow in the electrical conductor; and
a locator comprising:
a receiver module configured to receive the circular magnetic field signal and the sonde dipole magnetic field signal and provide a corresponding line trace output signal and a sonde output signal;
a processing element configured to:
receive the line trace output signal and the sonde output signal and generate, based at least in part on the line trace output signal and the sonde output signal, information associated with a buried object, wherein the information associated with the buried object includes determining an indication of ambiguity and providing the indication of ambiguity on an output device when the measured sonde dipole magnetic field signal axis and the push-cable circular magnetic field signal axis are not aligned as determined by a difference in alignment between the axes; and
an output device operatively coupled to the processing element to provide a representation of the information associated with the buried object.

2. The system of claim 1, wherein the output device provides positional information of the buried object based on the information associated with the buried object.

3. The system of claim 2, wherein the output device is a visual display device, the positional information is provided on the visual display device, and wherein the representation of the push-cable position and depth and the representation of the sonde position includes a display of the push-cable and a representation of the sonde at the distal end of the display of the push-cable.

4. The system of claim 3, wherein the visual display device is an LCD display.

5. The system of claim 2, wherein an output device is an audio output device and the positional information is provided on the audio output device.

6. The system of claim 1, wherein the information associated with the buried object is further provided to a data storage device and stored therein in association with one or more images or videos provided from a camera.

7. The system of claim 1, wherein the sonde dipole magnetic field signal and line trace push-cable circular magnetic field signal are at different frequencies.

8. The system of claim 1, wherein generating information includes using the push-cable circular magnetic field signal and the sonde dipole magnetic field signal to determine data corresponding to a positional difference between a position of the sonde with respect to a pipe axis.

9. The system of claim 1, wherein the output device is a display device and the indication of ambiguity is a visual indication.

10. The system of claim 1, further including one or more sensors.

11. The system of claim 10, wherein the one or more sensors comprise at least one of a wireless link, a GPS sensor, an accelerometer, a gyroscope, an optical sensor, an image sensor, a camera, and a tracking device.

12. The system of claim 2, wherein the sonde is configured determine, measure, and wirelessly communicate tilt, including the degree and direction of tilt to the locator.

13. The system of claim 12, wherein the degree and direction of tilt are rendered on an output display.

14. The system of claim 13, wherein positional ambiguities between the line trace and sonde signals are indicated on the output display as one or more of a blurred line, a bent line, and a sonde icon.

15. The system of claim 1, wherein data collected by the locator system is logged and stored into a data base.

16. The method of claim 2, wherein the output display includes a representation of the push-cable position includes a representation of a bend in the push-cable, where the bend is determined at least in part based on the determined misalignment between the sonde axis and the utility pipe axis.

* * * * *